(12) United States Patent
Ito et al.

(10) Patent No.: US 9,358,964 B2
(45) Date of Patent: Jun. 7, 2016

(54) BRAKE DEVICE FOR VEHICLE

(75) Inventors: Yuki Ito, Saitama (JP); Yuki Hotani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 139 days.

(21) Appl. No.: 13/981,962

(22) PCT Filed: Jan. 31, 2012

(86) PCT No.: PCT/JP2012/052059
§ 371 (c)(1),
(2), (4) Date: Sep. 25, 2013

(87) PCT Pub. No.: WO2012/105526
PCT Pub. Date: Aug. 9, 2012

(65) Prior Publication Data
US 2014/0008965 A1  Jan. 9, 2014

(30) Foreign Application Priority Data

Jan. 31, 2011 (JP) .................. 2011-017717
Jan. 31, 2011 (JP) .................. 2011-017718
Jan. 31, 2011 (JP) .................. 2011-017719
Jan. 31, 2011 (JP) .................. 2011-017720
Jan. 31, 2011 (JP) .................. 2011-017721

(51) Int. Cl.
*B60T 13/68* (2006.01)
*B60T 17/22* (2006.01)
(Continued)

(52) U.S. Cl.
CPC .................. *B60T 8/17* (2013.01); *B60T 8/4081* (2013.01); *B60T 13/142* (2013.01); *B60T 13/58* (2013.01);
(Continued)

(58) Field of Classification Search
CPC ..... B60T 13/142; B60T 13/588; B60T 13/58; B60T 13/66; B60T 13/686; B60T 17/22; B60T 2270/406; B60T 13/662
See application file for complete search history.

(56) References Cited

U.S. PATENT DOCUMENTS

| 5,613,740 A | 3/1997 | Kawamoto et al. |
| 6,290,310 B1 | 9/2001 | Kusano |

(Continued)

FOREIGN PATENT DOCUMENTS

| CN | 101821139 A | 9/2010 |
| EP | 1932736 A1 | 6/2008 |

(Continued)

OTHER PUBLICATIONS

Supplementary European Search Report dated Jun. 18, 2014 issued in corresponding EP Patent Application 12 74 1634.

(Continued)

*Primary Examiner* — Anna Momper
(74) *Attorney, Agent, or Firm* — Carrier Blackman & Associates, P.C.; Joseph P. Carrier; Jeffrey T. Gedeon

(57) ABSTRACT

A brake device for a vehicle is provided in which when a slave cylinder generates a brake fluid pressure that is commensurate with the actual amount of operation of a brake pedal by a driver in a state in which a master cut valve is closed and a fluid path connecting a master cylinder to the slave cylinder is cut off, a wheel cylinder is actuated by the brake fluid pressure. Since deterioration determination means determines a leak in the downstream of the slave cylinder based on the actual amount of actuation of the slave cylinder detected by a slave cylinder stroke sensor and the actual brake fluid pressure generated by the slave cylinder and detected by a fluid pressure sensor, it is possible to rapidly determine a leak in the downstream of the slave cylinder.

27 Claims, 14 Drawing Sheets

(51) Int. Cl.
  *B60T 8/17* (2006.01)
  *B60T 8/40* (2006.01)
  *B60T 13/66* (2006.01)
  *B60T 13/14* (2006.01)
  *B60T 13/58* (2006.01)

(52) U.S. Cl.
  CPC ............ *B60T 13/586* (2013.01); *B60T 13/662* (2013.01); *B60T 13/686* (2013.01); *B60T 17/22* (2013.01); *B60T 2270/406* (2013.01)

(56) References Cited

U.S. PATENT DOCUMENTS

| | | | |
|---|---|---|---|
| 6,805,415 | B2 | 10/2004 | Isono et al. |
| 8,733,849 | B2 | 5/2014 | Tanaka et al. |
| 8,827,378 | B2 | 9/2014 | Toyohira et al. |
| 2007/0035179 | A1 | 2/2007 | Kling et al. |
| 2008/0210496 | A1 | 9/2008 | Ishii |
| 2008/0234909 | A1 | 9/2008 | Iwasaki et al. |
| 2009/0179483 | A1* | 7/2009 | Hatano .................. B60T 7/042 303/3 |
| 2012/0038208 | A1 | 2/2012 | Matsushita |
| 2012/0062023 | A1 | 3/2012 | Ohkubo et al. |
| 2012/0145494 | A1 | 6/2012 | Hatano |

FOREIGN PATENT DOCUMENTS

| | | | |
|---|---|---|---|
| EP | 1970271 | A1 | 9/2008 |
| GB | 2403520 | A | 1/2005 |
| JP | H11278238 | A | 10/1999 |
| JP | 2000335390 | A | 12/2000 |
| JP | 2001130400 | A | 5/2001 |
| JP | 2001219841 | A | 8/2001 |
| JP | 2005-343366 | A | 12/2005 |
| JP | 2008087723 | A | 4/2008 |
| JP | 2008162535 | A | 7/2008 |
| JP | 2008-230355 | A | 10/2008 |
| JP | 2009-137377 | A | 6/2009 |
| JP | 2009262836 | A | 11/2009 |
| JP | 2009-279966 | A | 12/2009 |
| WO | 2005/005215 | A2 | 1/2005 |
| WO | 2010/119889 | A1 | 10/2010 |
| WO | 2010/128652 | A1 | 11/2010 |
| WO | 2010/143660 | A1 | 12/2010 |

OTHER PUBLICATIONS

Official Communications dated Feb. 25, 2015 in the prosecution of corresponding Chinese Patent Application No. 201280006480.1.
Official Communications dated Aug. 19, 2015 issued in a corresponding Japanese Patent Application No. 2012-017506.
Official Communications dated Aug. 26, 2015 issued in a corresponding Japanese Patent Application No. 2012-017505.
Official Communication dated Feb. 3, 2016 in corresponding Japanese Application No. 2012-017506.

* cited by examiner

WHEN POWER SOURCE IS OFF

BRAKE DEVICE FOR VEHICLE

TECHNICAL FIELD

The present invention relates to a so-called BBW (brake-by-wire) type brake device in which an amount of operation of a brake pedal by a driver is converted into an electrical signal to thus actuate a slave cylinder, and a wheel cylinder is actuated by a brake fluid pressure generated by the slave cylinder.

BACKGROUND ART

Such a BBW type brake device is known from, for example, Patent Document 1 below.

Conventionally, in order to detect a leak of brake fluid further downstream than a slave cylinder of this type of BBW type brake device, a reservoir of the slave cylinder is equipped with a brake fluid level sensor, and when the level of brake fluid in the reservoir attains a predetermined value or below it is determined that there is a leak.

RELATED ART DOCUMENTS

Patent Documents

Patent Document 1: Japanese Patent Application Laid-open No. 2005-343366

DISCLOSURE OF INVENTION

Problems to be Solved by the Invention

However, the above-mentioned conventional method has the problem that even if a leak occurs downstream of the slave cylinder, the occurrence of a leak cannot be detected until the level of brake fluid in the reservoir decreases to a predetermined value or below, and the occurrence of a leak cannot be determined rapidly.

The present invention has been accomplished in light of the above-mentioned circumstances, and it is an object thereof to rapidly determine a leak or a blockage in a fluid path of a BBW type brake device.

Means for Solving the Problems

In order to attain the above object, according to a first aspect of the present invention, there is provided a brake device for a vehicle comprising actual operation amount detection means that detects an actual amount of operation of a brake pedal by a driver, a master cylinder that generates a fluid pressure corresponding to the actual amount of operation of the brake pedal, a brake actuator that is driven according to the actual amount of operation, and a wheel cylinder that is actuated by a brake fluid pressure generated by the master cylinder or the brake actuator, the wheel cylinder being capable of being actuated independently from the fluid pressure generated by the master cylinder by actuation of the brake actuator in a state in which a cut-off valve for cutting off communication between the master cylinder and the wheel cylinder is closed, wherein the brake device comprises actual actuation amount detection means that detects an actual amount of actuation of the brake actuator, actual brake fluid pressure detection means that detects an actual brake fluid pressure generated by the brake actuator, deterioration determination means that discriminates a plurality of deterioration states including at least functional deterioration of a fluid path downstream of the cut-off valve based on the actual amount of actuation and the actual brake fluid pressure, and control means that controls the brake actuator in different modes according to a deterioration state discriminated by the deterioration determination means.

Further, according to a second aspect of the present invention, in addition to the first aspect, the brake device comprises change in characteristics determination means that determines a change in characteristics based on the actual amount of actuation and the actual brake fluid pressure, the change in characteristics determination means being arranged so as to determine a change in characteristics when the actual amount of actuation and the actual brake fluid pressure enter a change in characteristics region in which the actual amount of actuation and the actual brake fluid pressure deviate by a predetermined level or greater from reference characteristics defined from a relationship between the amount of actuation of the brake actuator and the brake fluid pressure generated by the brake actuator, the control means continuing to carry out control in a state in which the amount of actuation of the brake actuator is restricted when the change in characteristics determination means has determined that there is a change in characteristics, and the deterioration determination means determining that there is a deterioration when the actual amount of actuation and the actual brake fluid pressure reach a deterioration region set for a region where the actual amount of actuation and the actual brake fluid pressure exceed the change in characteristics region with respect to the reference characteristics.

Furthermore, according to a third aspect of the present invention, in addition to the first or second aspect, the deterioration determination means does not carry out determination of deterioration in a state in which the actual amount of actuation is equal to or less than a predetermined value.

Moreover, according to a fourth aspect of the present invention, in addition to any one of the first to third aspects, the brake device comprises a drive motor that is capable of applying a regenerative braking force to a wheel, and the deterioration determination means carries out determination of deterioration during regenerative braking by means of the drive motor.

Further, according to a fifth aspect of the present invention, in addition to the first aspect, the deterioration determination means monitors the state of a regenerative braking force and inhibits determination of deterioration when the deterioration determination means determines that the regenerative braking force is in a predetermined state.

Furthermore, according to a sixth aspect of the present invention, in addition to the first aspect, the brake actuator is arranged so as to generate a fluid pressure in each of a plurality of brake fluid paths, at least one wheel cylinder being connected to each line so that each is actuated by a respective brake fluid pressure generated by the brake actuator, the deterioration determination means determining, with a plurality of actual brake fluid pressure detection means that detect a plurality of actual brake fluid pressures generated by the slave cylinder in each line, that there is a one-line leak, which is a deterioration due to a leak occurring downstream of the cut-off valve on only one of the plurality of lines, based on the actual amount of actuation and the plurality of actual brake fluid pressures.

Moreover, according to a seventh aspect of the present invention, in addition to the sixth aspect, when the deterioration determination means determines that there is a one-line leak, control of only one line by means of the brake actuator is continued based on an actual brake fluid pressure detected by the actual brake fluid pressure detection means of another line.

Further, according to an eighth aspect of the present invention, in addition to the sixth aspect, the control means comprises target actuation amount change means that changes the target amount of actuation for the brake actuator when the deterioration determination means determines that there is a one-line leak.

Furthermore, according to a ninth aspect of the present invention, in addition to the sixth aspect, the target actuation amount change means restricts change of the target amount of actuation until the actual amount of operation attains zero after the deterioration determination means determines that there is a one-line leak.

Moreover, according to a tenth aspect of the present invention, in addition to the eighth or ninth aspect, the brake device comprises notification means that notifies a driver of a change in the target amount of actuation prior to the target actuation amount change means changing the target amount of actuation.

Further, according to an eleventh aspect of the present invention, in addition to the eighth or ninth aspect, the target actuation amount change means changes the target amount of actuation such that the braking force generated after the target amount of actuation is changed is smaller than the braking force generated before the target amount of actuation is changed.

Furthermore, according to a twelfth aspect of the present invention, in addition to the first aspect, the brake device comprises a stroke simulator that receives brake fluid from the master cylinder and applies a reaction force to operation of the brake pedal, and upstream fluid pressure detection means that detects an upstream fluid pressure generated by the master cylinder, the deterioration determination means determining that there is a blockage of a fluid path between the master cylinder and the cut-off valve or blockage of a fluid path between the master cylinder and the stroke simulator based on the actual amount of operation and the upstream fluid pressure.

Moreover, according to a thirteenth aspect of the present invention, in addition to the twelfth aspect, the deterioration determination means sets a threshold value for the brake fluid pressure in a map showing the relationship between the amount of operation of the brake pedal and the brake fluid pressure generated by the master cylinder, and determines that there is a blockage when the actual brake fluid pressure is at least the threshold value for the given actual amount of operation.

Further, according to a fourteenth aspect of the present invention, in addition to the thirteenth aspect, the deterioration determination means does not carry out determination of a blockage in a state in which the actual brake fluid pressure is a predetermined value or below.

Furthermore, according to a fifteenth aspect of the present invention, in addition to the thirteenth aspect, the threshold value increases non-linearly in response to an increase in the amount of operation of the brake pedal.

Moreover, according to a sixteenth aspect of the present invention, in addition to the thirteenth aspect, when the deterioration determination means determines that there is a blockage, the cut-off valve is opened, and control of the brake actuator is stopped.

Further, according to a seventeenth aspect of the present invention, in addition to the first aspect, the brake device comprises a stroke simulator that receives brake fluid from the master cylinder and applies a reaction force to operation of the brake pedal, and upstream fluid pressure detection means that detects an upstream fluid pressure generated by the master cylinder, and the deterioration determination means determines that a leak has occurred in a fluid path between the master cylinder and the cut-off valve and that a leak has occurred in a fluid path between the master cylinder and the stroke simulator based on the actual amount of operation and the upstream fluid pressure.

Furthermore, according to an eighteenth aspect of the present invention, in addition to the seventeenth aspect, the deterioration determination means sets a threshold value for the brake fluid pressure in a map showing the relationship between the amount of operation of the brake pedal and the brake fluid pressure generated by the master cylinder and determines that there is a leak when the actual brake fluid pressure for the given actual amount of operation is equal to or less than the threshold value.

Moreover, according to a nineteenth aspect of the present invention, in addition to the seventeenth aspect, the deterioration determination means does not carry out determination of a leak in a state in which the actual amount of operation is a predetermined value or below.

Further, according to a twentieth aspect of the present invention, in addition to the seventeenth aspect, the threshold value increases non-linearly in response to an increase in the amount of operation of the brake pedal.

Furthermore, according to a twenty-first aspect of the present invention, in addition to the seventeenth aspect, when the deterioration determination means has determined that there is a leak, only notification of an abnormality is carried out without the control mode of the brake actuator being changed.

Moreover, according to a twenty-second aspect of the present invention, in addition to the first aspect, the brake actuator is arranged so as to generate a fluid pressure in each of a plurality of brake fluid paths, at least one of the wheel cylinder is connected to each line so that each is actuated by the respective brake fluid pressure generated by the brake actuator, and the deterioration determination means determines that there is a downstream blockage, which is a deterioration due to a flow path blockage occurring downstream of the cut-off valve in at least one of the plurality of lines, based on the actual amount of actuation and the plurality of actual brake fluid pressures, with a plurality of actual brake fluid pressure detection means that detect a plurality of actual brake fluid pressures in the respective lines generated by the brake actuator.

Further, according to a twenty-third aspect of the present invention, in addition to the twenty-second aspect, the deterioration determination means sets a threshold value for a brake fluid pressure in a map showing the relationship between the actual amount of actuation and the brake fluid pressure generated by the brake actuator, and determines that there is a downstream blockage when the actual brake fluid pressure for the given actual amount of actuation is at least the threshold value.

Furthermore, according to a twenty-fourth aspect of the present invention, in addition to the twenty-third aspect, the deterioration determination means does not carry out determination of the blockage in a state in which the actual brake fluid pressure is a predetermined value or below.

Moreover, according to a twenty-fifth aspect of the present invention, in addition to the twenty-third aspect, the threshold value increases non-linearly in response to an increase in the amount of operation of the brake pedal.

Further, according to a twenty-sixth aspect of the present invention, in addition to the twenty-second aspect, when the deterioration determination means determines that there is a blockage, the cut-off valve is opened, and control of the brake actuator is stopped.

Furthermore, according to a twenty-seventh aspect of the present invention, in addition to the first aspect, the brake device comprises a stroke simulator that receives brake fluid from the master cylinder and applies a reaction force to operation of the brake pedal and upstream fluid pressure detection means that detects an upstream fluid pressure generated by the master cylinder, the deterioration determination means determines that there is a blockage in a fluid path from the master cylinder to the wheel cylinder based on the upstream fluid pressure, the actual brake fluid pressure, the actual amount of operation, and the actual amount of actuation, and determines that there is a leak in a fluid path from the master cylinder to the wheel cylinder based on the upstream fluid pressure, the actual brake fluid pressure, the actual amount of operation, and the actual amount of actuation, and the control means opens the cut-off valve and stops actuation of the brake actuator when the deterioration determination means determines that there is the blockage, and closes the cut-off valve and allows actuation of the brake actuator when the deterioration determination means determines that there is a leak.

It should be noted here that first and second master cut valves 32 and 33 of an embodiment correspond to the cut-off valve of the present invention, a slave cylinder 42 of the embodiment corresponds to the brake actuator of the present invention, a first fluid pressure sensor Sa of the embodiment corresponds to the upstream fluid pressure detection means of the present invention, a second fluid pressure sensor Sb and a third fluid pressure sensor Sc of the embodiment correspond to the actual brake fluid pressure detection means of the present invention, a brake pedal stroke sensor Sd of the embodiment corresponds to the actual amount of operation detection means of the present invention, and a slave cylinder stroke sensor Se of the embodiment corresponds to the actual amount of actuation detection means of the present invention.

Effects of the Invention

In accordance with the first aspect of the present invention, when the brake actuator generates a brake fluid pressure corresponding to the actual amount of operation of the brake pedal by the driver, the wheel cylinder is actuated by the brake fluid pressure. Since the deterioration determination means determines that there is a leak or blockage, which is a deterioration of the fluid path, based on the actual amount of actuation of the brake actuator detected by the actual amount of actuation detection means and the actual brake fluid pressure generated by the brake actuator and detected by the actual brake fluid pressure detection means, it is possible to rapidly determine that there is a leak or a blockage.

Furthermore, in accordance with the second aspect of the present invention, since the deterioration determination means determines that there is a leak or a blockage by applying the actual amount of actuation and the actual brake fluid pressure to the map showing the relationship between the amount of actuation of the brake actuator and the brake fluid pressure generated by the brake actuator, it is possible to reliably determine that there is a leak or a blockage by a simple calculation.

Moreover, in accordance with the third aspect of the present invention, since the deterioration determination means does not carry out determination of a leak or a blockage in a state in which the actual amount of actuation is a predetermined value or below, it is possible to avoid an erroneous determination at a time of low temperature or at a time of low load when the change in actual brake fluid pressure is small and detection with high precision is difficult.

Furthermore, in accordance with the fourth aspect of the present invention, since the deterioration determination means carries out determination of a leak or a blockage during regenerative braking by means of the drive motor, which can impose a regenerative braking force on the wheel, it becomes possible to carry out determination of a leak or a blockage even during regenerative braking, for which the relationship between the stroke of the brake pedal and the brake fluid pressure is different from that when the situation is normal.

Moreover, in accordance with the fifth aspect of the present invention, since the deterioration determination means monitors the state of the regenerative braking force and inhibits determination of a leak or a blockage when this regenerative braking force is determined to be in the predetermined state, when the relationship between the stroke of the brake pedal and the brake fluid pressure is changed greatly by switching between execution and non-execution of regenerative braking, it is possible to prevent erroneous determination of a leak or a blockage from being carried out.

Furthermore, in accordance with the sixth aspect of the present invention, since the deterioration determination means determines that there is a leak downstream of the cut-off valve based on the actual amount of actuation of the brake actuator detected by the actual amount of actuation detection means and the actual brake fluid pressure of the plurality of lines detected by the plurality of actual brake fluid pressure detection means, it is possible to reliably identify a line that experiences a leak among the plurality of lines.

Moreover, in accordance with the seventh aspect of the present invention, since when the deterioration determination means determines that there is a one-line leak, control of the brake actuator is continued based on the actual brake fluid pressure detected by the actual brake fluid pressure detection means of the other line, it is possible to continue to carry out braking by the brake actuator without problems even if a leak occurs.

Furthermore, in accordance with the eighth aspect of the present invention, since when the deterioration determination means determines that there is a one-line leak the target amount of actuation change means changes the target amount of actuation, even if the brake fluid pressure generated by the brake actuator decreases due to the one-line leak, it is possible to ensure that there is a braking force corresponding to the actual amount of operation of the brake pedal by changing the target amount of actuation so as to compensate for the decrease.

Moreover, in accordance with the ninth aspect of the present invention, since after the deterioration determination means determines that there is a one-line leak and the actual amount of operation then becomes zero, the target amount of actuation change means changes the target amount of actuation, it is possible to prevent the braking force from suddenly changing due to the target amount of actuation being changed during braking, thereby avoiding the driver experiencing an uncomfortable sensation.

Furthermore, in accordance with the tenth aspect of the present invention, since prior to the target amount of actuation change means changing the target amount of actuation, the notification means notifies the driver of a change in the target amount of actuation, it is possible for the driver to anticipate a change in the braking force due to the change in the target amount of actuation.

Moreover, in accordance with the eleventh aspect of the present invention, since the target amount of actuation change means changes the target amount of actuation such that the braking force generated after changing the target amount of actuation is smaller than the braking force generated before the change, it is possible for the driver to recognize the occurrence of a leak as a decrease in the braking force.

Furthermore, in accordance with the twelfth aspect of the present invention, when the brake actuator generates a brake fluid pressure that is commensurate with the actual amount of operation of the brake pedal by the driver, the wheel cylinder is actuated by the brake fluid pressure. In this process, due to the stroke simulator receiving the brake fluid issued from the master cylinder, a simulated reaction force is applied to the brake pedal. Since the deterioration determination means determines that there is a blockage of the fluid path between the master cylinder and the cut-off valve or a blockage of the fluid path between the master cylinder and the stroke simulator based on the actual amount of operation of the brake pedal detected by the actual amount of operation detection means and the actual brake fluid pressure generated by the master cylinder and detected by the upstream fluid pressure detection means, it is possible to reliably determine that there is a blockage in a fluid path.

Moreover, in accordance with the thirteenth aspect of the present invention, since the deterioration determination means sets a threshold value for the brake fluid pressure in the map showing the relationship between the amount of operation of the brake pedal and the brake fluid pressure generated by the master cylinder and determines that there is a blockage of a fluid path when the actual brake fluid pressure for a given actual amount of operation is the threshold value or greater, it is possible to reliably determine that there is a blockage of a fluid path by a simple calculation.

Furthermore, in accordance with the fourteenth aspect of the present invention, since the deterioration determination means does not carry out determination of a blockage of a fluid path in a state in which the actual brake fluid pressure is a predetermined value or below, it is possible to avoid an erroneous determination at a time of low load when the change in actual brake fluid pressure is small and detection with high precision is difficult.

Moreover, in accordance with the fifteenth aspect of the present invention, since the threshold value increases non-linearly according to an increase in the amount of operation of the brake pedal, the slope of the threshold value can be set so as to match the output characteristics of the master cylinder, in which in the initial stage of operation of the brake pedal the brake fluid pressure rises slowly and after that the brake fluid pressure rises rapidly, and it is thereby possible to avoid an erroneous determination over the entire region of the amount of operation of the brake pedal.

Furthermore, in accordance with the sixteenth aspect of the present invention, since when the deterioration determination means determines that there is a blockage the cut-off valve is opened and control of the brake actuator is stopped, it is possible to transmit the brake fluid pressure generated by the master cylinder to the wheel cylinder via a fluid path in which no blockage is occurring, thereby ensuring that there is a minimum necessary braking force.

Moreover, in accordance with the seventeenth aspect of the present invention, since the deterioration determination means determines that there is a leak in a fluid path between the master cylinder and the cut-off valve or a leak in a fluid path between the master cylinder and the stroke simulator based on the actual amount of operation of the brake pedal detected by the actual amount of operation detection means and the actual brake fluid pressure generated by the master cylinder and detected by the upstream fluid pressure detection means, it is possible to rapidly determine that there is a leak in a fluid path.

Furthermore, in accordance with the eighteenth aspect of the present invention, since the deterioration determination means sets a threshold value for the brake fluid pressure in the map showing the relationship between the amount of operation of the brake pedal and the brake fluid pressure generated by the master cylinder and determines that there is a leak when the actual brake fluid pressure for the predetermined actual amount of operation is the threshold value or below, it is possible to reliably determine that there is a leak by a simple calculation.

Moreover, in accordance with the nineteenth aspect of the present invention, since the deterioration determination means does not carry out determination of a leak in a state in which the actual amount of operation is a predetermined value or below, it is possible to avoid an erroneous determination at a time of low load when the change in actual brake fluid pressure is small and detection with high precision is difficult.

Furthermore, in accordance with the twentieth aspect of the present invention, since the threshold value increases non-linearly according to an increase in the amount of operation of the brake pedal, the slope of the threshold value can be set so as to match the output characteristics of the master cylinder, in which in the initial stage of operation of the brake pedal the brake fluid pressure rises slowly and after that the brake fluid pressure rises rapidly, and it is thereby possible to avoid an erroneous determination over the entire region of the amount of operation of the brake pedal.

Moreover, in accordance with the twenty-first aspect of the present invention, when the deterioration determination means determines that there is a leak in a fluid path between the master cylinder and the cut-off valve or a leak in a fluid path between the master cylinder and the stroke simulator, since there is no influence on the generation of brake fluid pressure by the brake actuator, it is possible to continue braking by means of the brake actuator without changing the control mode of the brake actuator and only carrying out notification of an abnormality.

Furthermore, in accordance with the twenty-second aspect of the present invention, since the deterioration determination means determines that a flow path blockage has occurred downstream of the cut-off valve of at least one of the plurality of lines based on the actual amount of actuation of the brake actuator detected by the actual amount of actuation detection means and the plurality of actual brake fluid pressures detected by the plurality of actual brake fluid pressure detection means, it is possible to reliably identify a blocked line among the plurality of lines.

Moreover, in accordance with the twenty-third aspect of the present invention, since the deterioration determination means sets a threshold value for the brake fluid pressure in the map showing the relationship between the actual amount of actuation of the brake actuator and the brake fluid pressure generated by the brake actuator and determines that there is a downstream blockage when the actual brake fluid pressure for the predetermined actual amount of actuation is the threshold value or greater, it is possible to reliably determine that there is a downstream blockage by a simple calculation.

Furthermore, in accordance with the twenty-fourth aspect of the present invention, since the deterioration determination means does not carry out determination of a blockage of a fluid path in a state in which the actual brake fluid pressure is a predetermined value or below, it is possible to avoid an erroneous determination at a time of low load when the change in actual brake fluid pressure is small and detection with high precision is difficult.

Moreover, in accordance with the twenty-fifth aspect of the present invention, since the threshold value increases non-linearly according to an increase in the amount of operation of the brake pedal, the slope of the threshold value can be set so as to match the output characteristics of the master cylinder, in which in the initial stage of operation of the brake pedal the brake fluid pressure rises slowly and after that the brake fluid pressure rises rapidly, and it is thereby possible to avoid an erroneous determination over the entire region of the amount of operation of the brake pedal.

Furthermore, in accordance with the twenty-sixth aspect of the present invention, since when the deterioration determination means determines that there is a blockage the cut-off valve is opened and control of the brake actuator is stopped, it is possible to transmit the brake fluid pressure generated by the master cylinder to the wheel cylinder via a fluid path in which no blockage is occurring, thereby ensuring that there is a minimum necessary braking force.

Moreover, in accordance with the twenty-seventh aspect of the present invention, since when the deterioration determination means determines that there is a blockage in the fluid path from the master cylinder to the wheel cylinder based on the upstream fluid pressure, the actual brake fluid pressure, the actual amount of operation, and the actual amount of actuation, the control means opens the cut-off valve and stops actuation of the brake actuator, it is possible to transmit the brake fluid pressure generated by the master cylinder to the wheel cylinder via a fluid path in which no blockage is occurring, thereby ensuring that there is a minimum necessary braking force. Furthermore, since when the deterioration determination means determines that there is a leak in the fluid path from the master cylinder to the wheel cylinder based on the upstream fluid pressure, the actual brake fluid pressure, the actual amount of operation, and the actual amount of actuation, the control means blocks the cut-off valve and allows actuation of the brake actuator, it is possible to transmit the brake fluid pressure generated by the brake actuator to the wheel cylinder via the fluid path of a line in which there is no leak, thereby ensuring that there is a minimum necessary braking force.

EXPLANATION OF REFERENCE NUMERALS AND SYMBOLS

Figure 1:
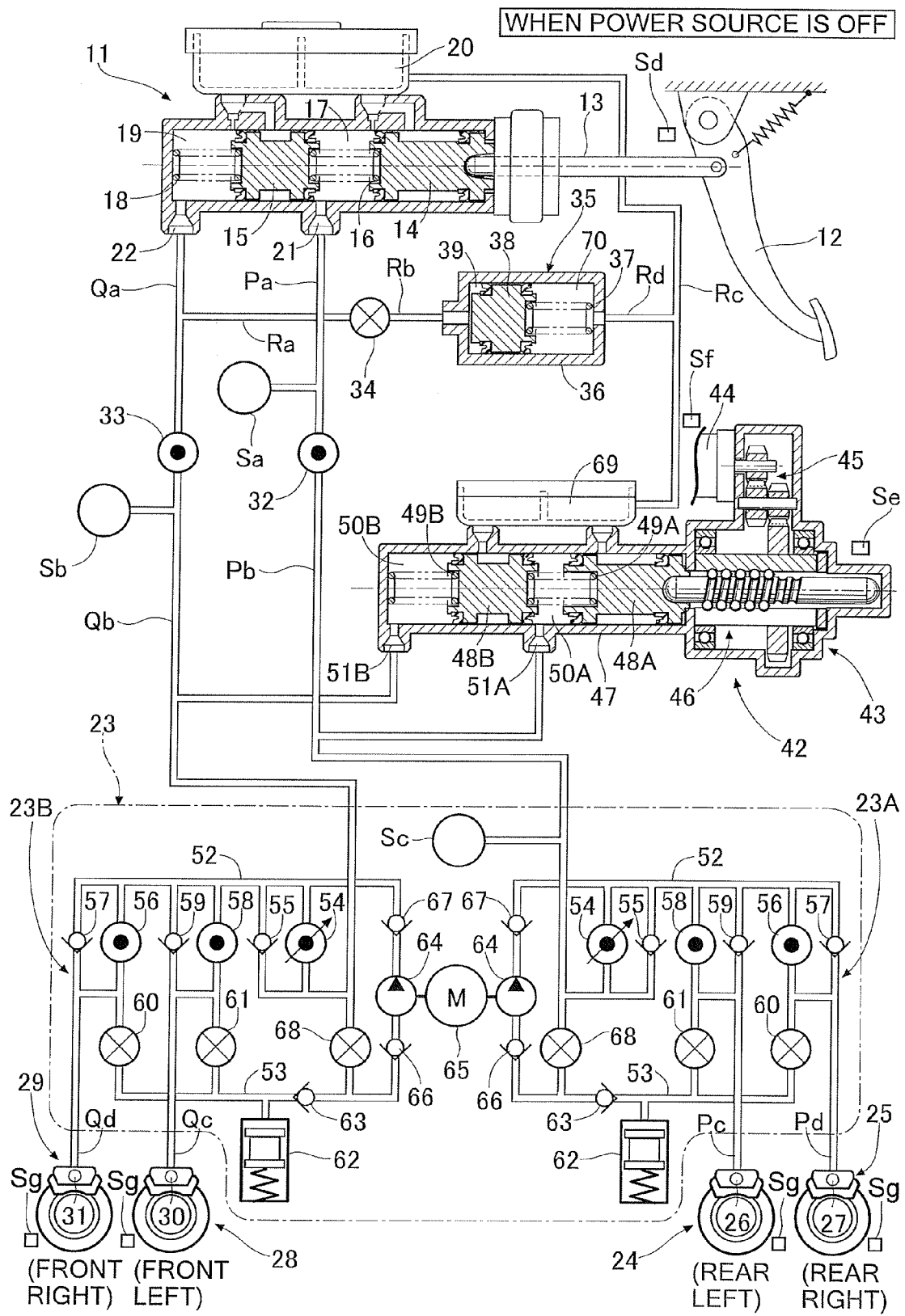
FIG. 1 is a hydraulic circuit diagram of a brake device for a vehicle. (first embodiment)

11 Master cylinder
12 Brake pedal
26 Wheel cylinder
27 Wheel cylinder
30 Wheel cylinder
31 Wheel cylinder
32 First master cut valve (cut-off valve)
33 Second master cut valve (cut-off valve)
35 Stroke simulator
42 Slave cylinder (brake actuator)
71 Notification means
M1 Deterioration determination means
M3 Target amount of actuation change means
M4 Change in characteristics determination means
M5 Control means
Sa First fluid pressure sensor (upstream fluid pressure detection means)
Sb Second fluid pressure sensor (actual brake fluid pressure detection means)
Sc Third fluid pressure sensor (actual brake fluid pressure detection means)
Sd Brake pedal stroke sensor (actual amount of operation detection means)
Se Slave cylinder stroke sensor (actual amount of actuation detection means)

MODES FOR CARRYING OUT THE INVENTION

A first embodiment of the present invention is explained below by reference to FIG. 1 to FIG. 7.

First Embodiment

As shown in FIG. 1, a tandem type master cylinder 11 includes a first piston 14 that is connected via a push rod 13 to a brake pedal 12 operated by a driver, and a second piston 15 that is disposed in front of the first piston 14, a first fluid pressure chamber 17 housing a return spring 16 is defined between the first piston 14 and the second piston 15, and a second fluid pressure chamber 19 housing a return spring 18 is defined in front of the second piston 15. The first fluid pressure chamber 17 and the second fluid pressure chamber 19, which are capable of communicating with a reservoir 20, include a first output port 21 and a second output port 22 respectively. The first output port 21 is connected to for example wheel cylinders 26 and 27 (first line) of disk brake devices 24 and 25 of rear left and right wheels via fluid paths Pa and Pb, a VSA (vehicle stability assist) device 23, and fluid paths Pc and Pd. The second output port 22 is connected to for example wheel cylinders 30 and 31 (second line) of disk brake devices 28 and 29 of front left and right wheels via fluid paths Qa and Qb, the VSA device 23, and fluid paths Qc and Qd.

In the present specification, upstream sides of the fluid paths Pa to Pd and the fluid paths Qa to Qd mean the master cylinder 11 side, and downstream sides mean the wheel cylinders 26, 27, 30, and 31 sides.

A first master cut valve 32, which is a normally open solenoid valve, is disposed between the fluid paths Pa and Pb, and a second master cut valve 33, which is a normally open solenoid valve, is disposed between the fluid paths Qa and Qb. Supply-side fluid paths Ra and Rb branching from the fluid path Qa on the upstream side of the second master cut valve 33 are connected to a stroke simulator 35 via a simulator valve 34, which is a normally closed solenoid valve. The stroke simulator 35 has a piston 38, urged by a spring 37, slidably fitted into a cylinder 36, and a fluid pressure chamber 39 formed on the side of the piston 38 opposite to the spring 37 communicates with the supply-side fluid path Rb.

A tandem type slave cylinder 42 is connected to the fluid path Pb and the fluid path Qb on the downstream side of the first and second master cut valves 32 and 33. An actuator 43 that actuates the slave cylinder 42 transmits rotation of a motor 44 to a ball screw mechanism 46 via a gear train 45. Slidably fitted into a cylinder main body 47 of the slave cylinder 42 are a first piston 48A driven by the ball screw mechanism 46 and a second piston 48B positioned in front of the first piston 48A. A first fluid pressure chamber 50A housing a return spring 49A is defined between the first piston 48A and the second piston 48B, and a second fluid pressure chamber 50B housing a return spring 49B is defined in front of the second piston 48B. When the first and second pistons 48A and 48B are driven in the forward direction by means of the ball screw mechanism 46 of the actuator 43, a brake fluid pressure generated in the first and second fluid pressure chambers 50A and 50B is transmitted to the fluid paths Pb and Qb via first and second output ports 51A and 51B.

A reservoir 69 of the slave cylinder 42 and the reservoir 20 of the master cylinder 11 are connected via a discharge side fluid path Rc, and a back chamber 70 of the piston 38 of the stroke simulator 35 is connected to an intermediate part of the discharge side fluid path Rc via a discharge side fluid path Rd.

The structure of the VSA device 23 is well known; a first brake actuator 23A for controlling the first line of the disk brake devices 24 and 25 for the rear left and right wheels and a second brake actuator 23B for controlling the second line of the disk brake devices 28 and 29 for the front left and right wheels are provided, these having identical structures.

The first brake actuator 23A of the first line of the disk brake devices 24 and 25 for the rear left and right wheels is explained below as being representative thereof.

The first brake actuator 23A is disposed between the fluid path Pb, which is connected to the first master cut valve 32 positioned on the upstream side, and the fluid paths Pc and Pd, which are connected respectively to the wheel cylinders 26 and 27 for the rear left and right wheels positioned on the downstream side.

The first brake actuator 23A includes a fluid path 52 and a fluid path 53 that are common to the wheel cylinders 26 and 27 of the rear left and right wheels, and includes a regulator valve 54 that is a normally open solenoid valve with a variable degree of opening and that is disposed between the fluid path Pb and the fluid path 52, a check valve 55 that is disposed in parallel to the regulator valve 54 and allows brake fluid to flow from the fluid path Pb side to the fluid path 52 side, an in-valve 56 that is a normally open solenoid valve and is disposed between the fluid path 52 and the fluid path Pd, a check valve 57 that is disposed in parallel to the in-valve 56 and allows brake fluid to flow from the fluid path Pd side to the fluid path 52 side, an in-valve 58 that is a normally open solenoid valve and is disposed between the fluid path 52 and the fluid path Pc, a check valve 59 that is disposed in parallel to the in-valve 58 and allows brake fluid to flow from the fluid path Pc side to the fluid path 52 side, an out valve 60 that is a normally closed solenoid valve and is disposed between the fluid path Pd and the fluid path 53, an out valve 61 that is a normally closed solenoid valve and is disposed between the fluid path Pc and the fluid path 53, a reservoir 62 that is connected to the fluid path 53, a check valve 63 that is disposed between the fluid path 53 and the fluid path Pb and allows brake fluid to flow from the fluid path 53 side to the fluid path Pb side, a pump 64 that is disposed between the fluid path 52 and the fluid path 53 and supplies brake fluid from the fluid path 53 side to the fluid path 52 side, a motor 65 that drives the pump 64, a pair of check valves 66 and 67 that are provided on the intake side and the discharge side of the pump 64 and prevent the backflow of brake fluid, and a suction valve 68 that is a normally closed solenoid valve and is disposed between the fluid path Pb and an intermediate position between the check valve 63 and the pump 64.

The motor 65 is used in common among the pumps 64 and 64 of the first and second brake actuators 23A and 23B, but it is also possible to provide motors 65 and 65 that are exclusively used for the respective pumps 64 and 64.

Figure 2:
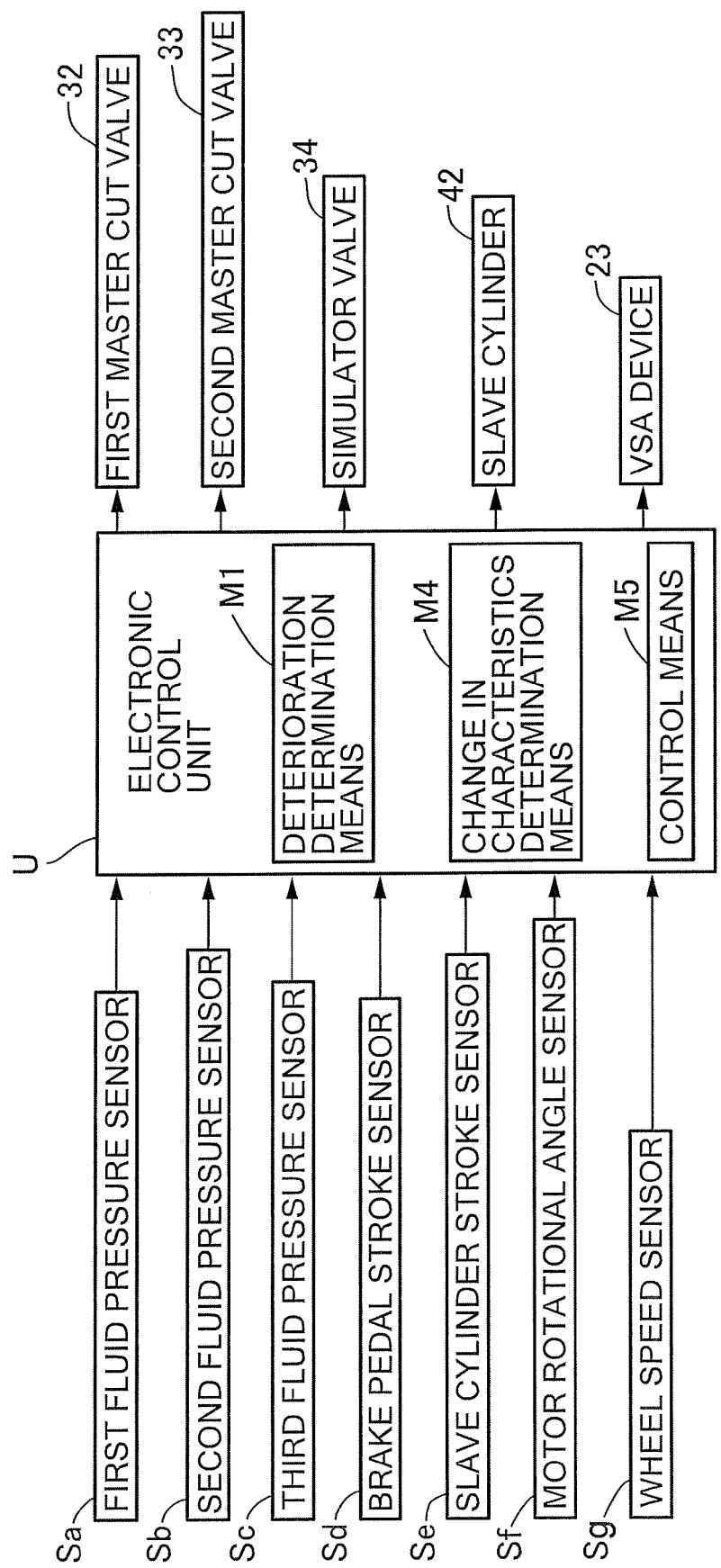
FIG. 2 is a diagram showing the arrangement of a control system for the brake device for a vehicle. (first embodiment)

As shown in FIG. 1 and FIG. 2, connected to the fluid path Pa upstream of the first master cut valve 32 is a first fluid pressure sensor Sa that detects a fluid pressure therein, connected to the fluid path Qb downstream of the second master cut valve 33 is a second fluid pressure sensor Sb that detects a fluid pressure therein, and connected to the fluid path Pb downstream of the first master cut valve 32 is a third fluid pressure sensor Sc that detects a fluid pressure therein. As the third fluid pressure sensor Sc, a fluid pressure sensor for controlling the VSA device 23 is used as it is.

Connected to an electronic control unit U connected to the first and second master cut valves 32 and 33, the simulator valve 34, the slave cylinder 42, and the VSA device 23 are the first fluid pressure sensor Sa, the second fluid pressure sensor Sb, the third fluid pressure sensor Sc, a brake pedal stroke sensor Sd that detects a stroke of the brake pedal 12, a slave cylinder stroke sensor Se that detects a stroke of the slave cylinder 42, a motor rotational angle sensor Sf that detects a rotational angle of the motor 44, and wheel speed sensors Sg that detect a wheel speed of each wheel.

The electronic control unit U is provided with deterioration determination means M1 that determines that there is a leak of brake fluid downstream of the slave cylinder 42 based on the actual stroke of the slave cylinder 42 detected by the slave cylinder stroke sensor Se and the actual brake fluid pressure downstream of the slave cylinder 42 detected by the second fluid pressure sensor Sb and the third fluid pressure sensor Sc. Furthermore, the electronic control unit U includes change in characteristics determination means M4 that determines a change in characteristics of a brake line caused by a leak, etc. based on the actual stroke of the slave cylinder 42 and the actual brake fluid pressure generated by the slave cylinder 42, and control means M5 that controls the actuation of the slave cylinder 42 based on the result of determination by the deterioration determination means M1.

The operation of the first embodiment of the present invention having the above arrangement is now explained.

Figure 3:
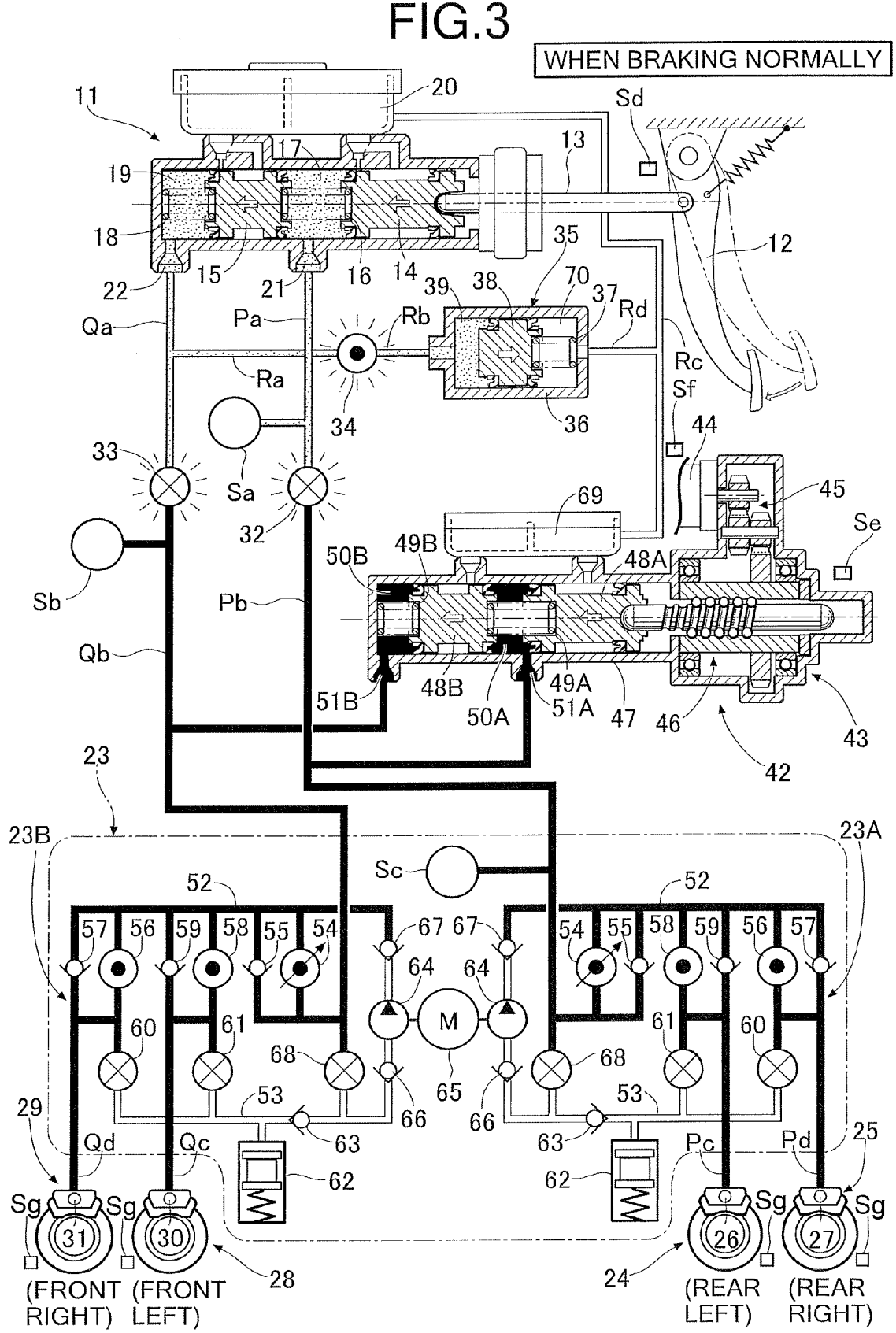
FIG. 3 is a hydraulic circuit diagram at a time of normal braking of the brake device for a vehicle. (first embodiment)

A normal braking operation when the situation is normal is first explained by reference to FIG. 3.

When the situation is normal and the system is functioning normally, when the first fluid pressure sensor Sa provided in the fluid path Pa detects depression of the brake pedal 12 by a driver, the first and second master cut valves 32 and 33, which are normally open solenoid valves, are energized and closed, and the simulator valve 34, which is a normally closed solenoid valve, is energized and opened. At the same time as this, the actuator 43 of the slave cylinder 42 is actuated, the first and second pistons 48A and 48B move forward, a brake fluid pressure is thereby generated in the first and second fluid pressure chambers 50A and 50B, and the brake fluid pressure is transmitted from the first and second output ports 51A and 51B to the fluid path Pb and the fluid path Qb and is transmitted from the two fluid paths Pb and Qb to the wheel cylinders 26, 27, 30, and 31 of the disk brake devices 24, 25, 28, and 29 via the opened in-valves 56, 56, 58, and 58 of the VSA device 23, thus braking each wheel.

Furthermore, since the simulator valve 34, which is a normally closed solenoid valve, is energized and opened, a brake fluid pressure generated by the second fluid pressure chamber 19 of the master cylinder 11 is transmitted to the fluid pressure chamber 39 of the stroke simulator 35 via the opened simulator valve 34, the piston 38 thereof is moved against the spring 37, the brake pedal 12 is thus allowed to travel, and a simulated pedal reaction force is generated, thereby eliminating any uncomfortable sensation for the driver.

Controlling the actuation of the actuator 43 of the slave cylinder 42 such that the brake fluid pressure due to the slave cylinder 42 detected by the second fluid pressure sensor Sb provided in the fluid path Qb attains a level corresponding to the brake fluid pressure due to the master cylinder 11 detected by the first fluid pressure sensor Sa provided in the fluid path Pa enables a braking force that is commensurate with the amount of operation inputted by the driver into the brake pedal 12 to be generated in the disk brake devices 24, 25, 28, and 29.

The operation of the VSA device 23 is now explained.

In a state in which the VSA device 23 is not being actuated, the regulator valves 54 and 54 are de-energized and opened, the suction valves 68 and 68 are de-energized and closed, the in-valves 56, 56, 58, and 58 are de-energized and opened, and the out valves 60, 60, 61, and 61 are de-energized and closed. Therefore, when the driver depresses the brake pedal 12 in order to carry out braking and the slave cylinder 42 is actuated, a brake fluid pressure outputted from the first and second output ports 51A and 51B of the slave cylinder 42 is supplied from the regulator valves 54 and 54 to the wheel cylinders 26, 27, 30, and 31 via the in-valves 56, 56, 58, and 58, which are in a valve-open state, thus braking the four wheels.

At the time of actuation of the VSA device 23, in a state in which the suction valves 68 and 68 are energized and opened the pumps 64 and 64 are driven by the motor 65, and brake fluid that has been taken in from the slave cylinder 42 side via the suction valves 68 and 68 and pressurized by the pumps 64 and 64 is supplied to the regulator valves 54 and 54 and the in-valves 56, 56, 58, and 58. Therefore, energizing the regulator valves 54 and 54 and adjusting the degree of opening so as to regulate the brake fluid pressure of the fluid paths 52 and 52 and selectively supplying the brake fluid pressure to the wheel cylinders 26, 27, 30, and 31 via the opened in-valves 56, 56, 58, and 58 enables the braking forces for the four wheels to be controlled individually even in a state in which the driver is not depressing the brake pedal 12.

Therefore, it is possible to individually control the braking force for the four wheels by means of the first and second brake actuators 23A and 23B, thereby enhancing the performance in turning by increasing the braking force for the inner wheel when turning or enhancing the performance of straight-line stability by increasing the braking force for the outer wheel when turning.

Furthermore, while the driver is carrying out braking by depressing the brake pedal 12, if it is detected based on the output of the wheel speed sensors Sg that for example the rear left wheel is on a road with a low coefficient of friction and there is a tendency for it to lock, after the brake fluid pressure of the wheel cylinder 26 for the rear left wheel is released to the reservoir 62 and decreased to a predetermined pressure by energizing and closing one in-valve 58 of the first brake actuator 23A and energizing and opening one out valve 61, the out valve 61 is de-energized and closed, thereby maintaining the brake fluid pressure of the wheel cylinder 26 for the rear left wheel. As a result, when the tendency for the wheel cylinder 26 for the rear left wheel to lock starts to disappear, de-energizing and opening the in-valve 58 allows the brake fluid pressure from the first output port 51A of the slave cylinder 42 to be supplied to the wheel cylinder 26 for the rear left wheel, thus increasing it to a predetermined pressure and thereby increasing the braking force.

If the rear left wheel again has a tendency to lock due to this increase in pressure, repeating the pressure decrease→maintenance→pressure increase as above enables ABS (antilock brake system) control, which minimizes the braking distance, to be carried out while suppressing locking of the rear left wheel.

ABS control when the wheel cylinder 26 for the rear left wheel has a tendency to lock is explained above, but ABS control when the wheel cylinder 27 for the rear right wheel, the wheel cylinder 30 for the front left wheel, or the wheel cylinder 31 for the front right wheel has a tendency to lock can also be carried out in the same manner.

Figure 4:
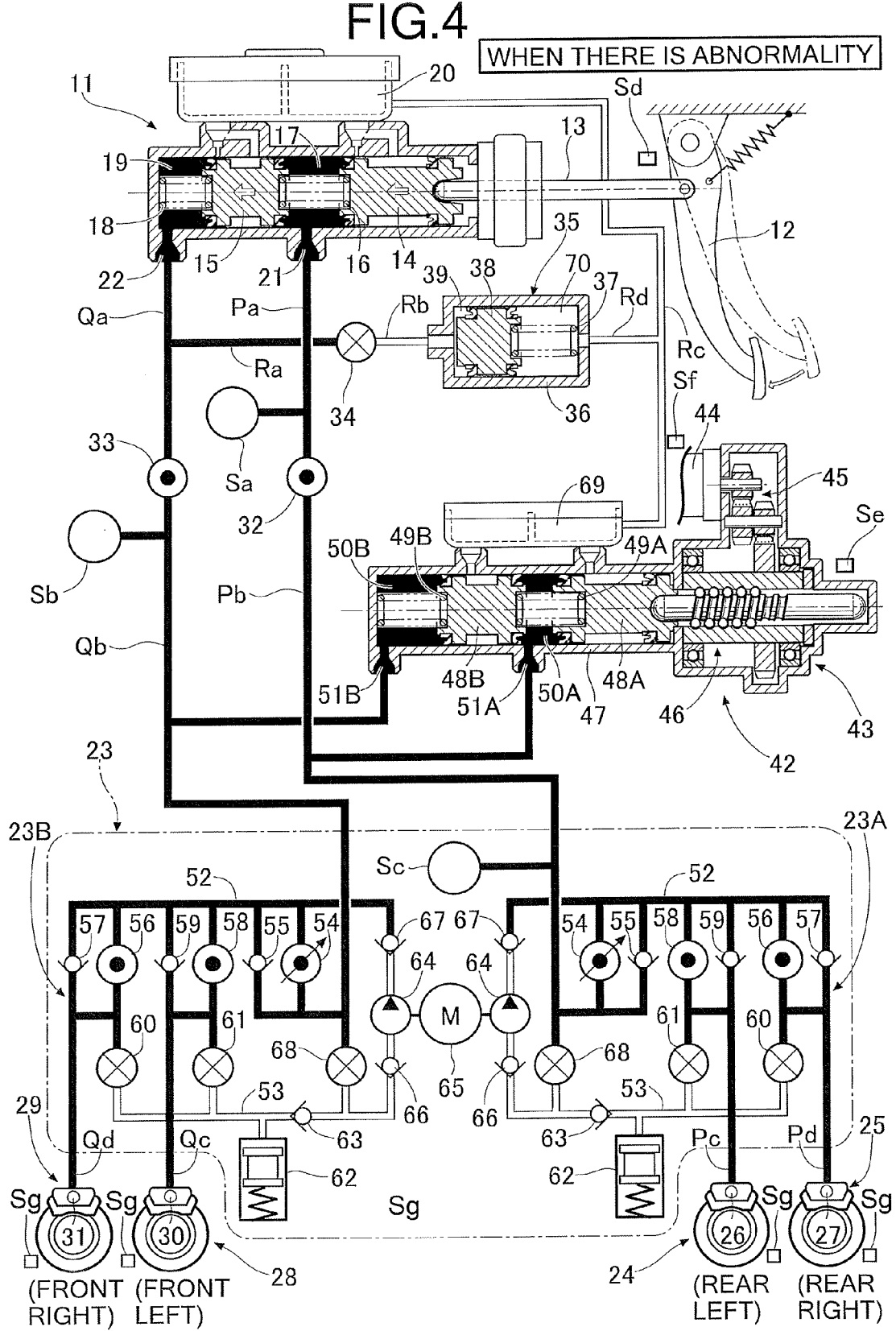
FIG. 4 is a hydraulic circuit diagram when there is an abnormality with the brake device for a vehicle. (first embodiment)

The operation when the slave cylinder 42 becomes incapable of being actuated due to a malfunction of a power source, etc. is now explained by reference to FIG. 4.

When a power source malfunctions, the first and second master cut valves 32 and 33, which are normally open solenoid valves, automatically open, the simulator valve 34, which is a normally closed solenoid valve, automatically closes, the in-valves 56, 56, 58, and 58 and the regulator valves 54 and 54, which are normally open solenoid valves, automatically open, and the out valves 60, 60, 61, and 61 and the suction valves 68 and 68, which are normally closed solenoid valves, automatically close. In this state, the brake fluid pressure generated in the first and second fluid pressure chambers 17 and 19 of the master cylinder 11 passes through the first and second master cut valves 32 and 33, the regulator valves 54 and 54, and the in-valves 56, 56, 58, and 58 without being absorbed by the stroke simulator 35, thus enabling the wheel cylinders 26, 27, 30, and 31 of the disk brake devices 24, 25, 30, and 31 for the respective wheels to be actuated and a braking force to be generated without any problem.

In this process, if the brake fluid pressure generated by the master cylinder 11 acted on the first and second fluid pressure chambers 50A and 50B of the slave cylinder 42 so as to make the first and second pistons 48A and 48B move backward, the volume of the first and second fluid pressure chambers 50A and 50B would increase, the brake fluid pressure would decrease, and there would be a possibility that the stroke of the brake pedal 12 would increase if an attempt were made to maintain the brake fluid pressure. However, since when a load is inputted into the ball screw mechanism 46 of the slave cylinder 42 from the first piston 48A side, backward movement is suppressed, the increase in volume of the first and second fluid pressure chambers 50A and 50B is lessened.

In addition, a member for restricting rearward movement of the first and second pistons 48A and 48B when there is a malfunction of the slave cylinder 42 may be provided separately. In this case, a structure in which drive resistance is not increased during normal actuation is desirable.

Control of the slave cylinder 42 is now explained by reference to FIG. 5 and FIG. 6.

Figure 5:
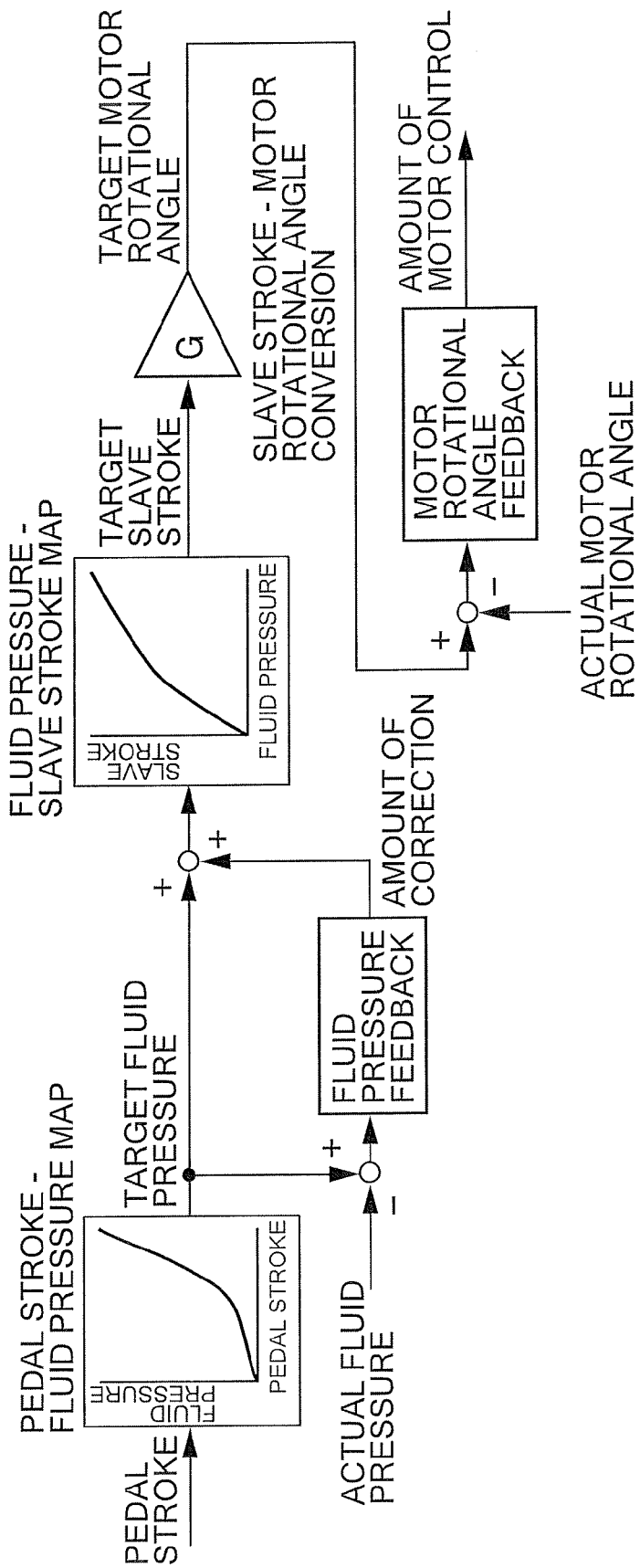
FIG. 5 is a block diagram of a control system for a slave cylinder. (first embodiment)
Figure 6:
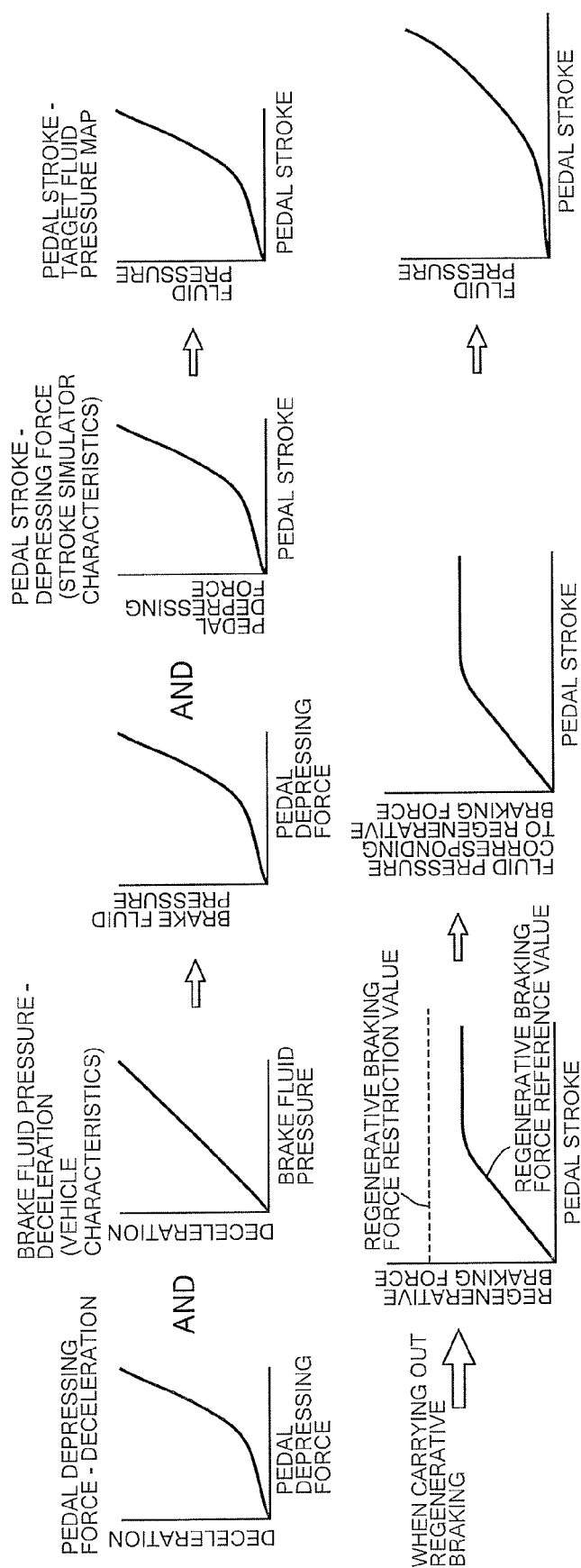
FIG. 6 is a diagram for explaining a method for calculating a pedal stroke—target fluid pressure map. (first embodiment)

As shown in FIG. 5, a stroke of the brake pedal 12 detected by the brake pedal stroke sensor Sd is converted into a target fluid pressure to be generated by the slave cylinder 42 using a pedal stroke—target fluid pressure map. This pedal stroke—target fluid pressure map is calculated by the procedure shown in FIG. 6.

That is, a map showing the relationship between the depressing force on the brake pedal 12 and the brake fluid pressure to be generated by the slave cylinder 42 is calculated from a map showing the relationship between the depressing force on the brake pedal 12 and the deceleration to be generated in the vehicle and a map showing the relationship between the brake fluid pressure generated by the slave cylinder 42 and the deceleration of the vehicle. Subsequently, a map (pedal stroke—target fluid pressure map) showing the relationship between the stroke of the brake pedal 12 and the target fluid pressure to be generated by the slave cylinder 42 is calculated from the above calculated map and a map showing the relationship between the stroke of the brake pedal 12 and the depressing force on the brake pedal 12.

In an electric automobile or a hybrid vehicle equipped with a drive motor, which is not illustrated but which is capable of regenerative braking, a value obtained by subtracting from the above target fluid pressure an amount of fluid pressure corresponding to the regenerative braking force is set as a final target fluid pressure, and it is thus possible to set a target fluid pressure corresponding to the stroke of the brake pedal 12 while taking into consideration the regenerative braking force (regenerative torque). Here, the regenerative braking force and the brake fluid pressure corresponding to the regenerative braking force can be determined by a known method, for example, by determining a regenerative braking force reference value corresponding to the pedal stroke from a map, etc., setting a regenerative braking force target value so as to correspond to the smaller among the regenerative braking force reference value and a regenerative braking force restriction value determined according to remaining battery capacity or temperature, determining a brake fluid pressure corresponding to the regenerative braking force target value from a map, etc., and subtracting this brake fluid pressure from the above target fluid pressure.

Returning to FIG. 5, correction is carried out by calculating a deviation between the target fluid pressure to be generated by the slave cylinder 42 calculated from the pedal stroke—target fluid pressure map and the actual fluid pressure generated by the slave cylinder 42 and detected by the second fluid pressure sensor Sb, and adding to the target fluid pressure a fluid pressure correction amount calculated from the deviation. Subsequently, the corrected target fluid pressure is applied to the map showing the relationship between the fluid pressure generated by the slave cylinder 42 and the stroke of the slave cylinder 42, thus calculating a target stroke for the slave cylinder 42. Subsequently, a deviation between the target rotational angle for the motor 44 calculated by multiplying the target stroke for the slave cylinder 42 by a predetermined gain and the actual rotational angle of the motor 44 detected by the motor rotational angle sensor Sf is calculated, and driving the motor 44 with a motor control amount calculated from the above deviation allows the slave cylinder 42 to generate a brake fluid pressure corresponding to the stroke of the brake pedal 12 detected by the brake pedal stroke sensor Sd.

Determination of a leak of brake fluid downstream of the slave cylinder 42 by the deterioration determination means M1 is now explained.

Figure 7:
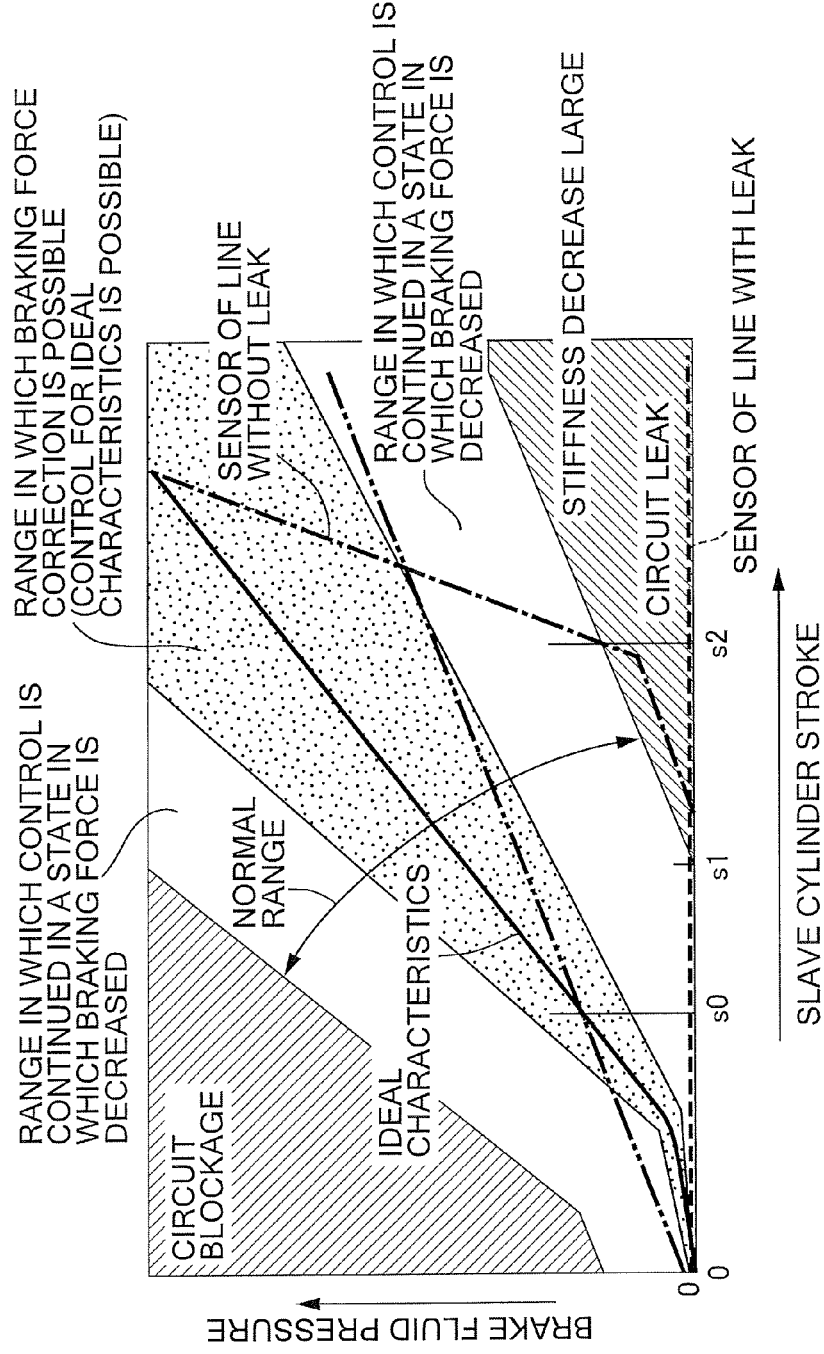
FIG. 7 is a diagram showing a map for determining a malfunction on the downstream side. (first embodiment)

FIG. 7 shows a map used in leak determination, and it shows the relationship between the stroke of the slave cylinder 42 and the brake fluid pressure generated in the fluid paths Pb and Qb downstream of the slave cylinder 42.

As shown in the figure by the solid line as ideal characteristics, at the beginning when the stroke of the slave cylinder 42 starts increasing from zero, the brake fluid pressure rises with a small slope. The reason why the slope when the brake fluid pressure starts to rise is small is because of flexing of a cap seal of the slave cylinder 42, swelling due to an increase in the internal pressure of the fluid paths Pb and Qb, etc., and this tendency becomes prominent at a time of low temperature when the viscosity of the brake fluid increases. When the stroke of the slave cylinder 42 exceeds a predetermined value, the brake fluid pressure increases with a constant slope that is larger than the above slope in response to an increase in the stroke.

It is assumed here that among the first and second lines, a leak has occurred in the fluid path Pb of the first line and a leak has not occurred in the fluid path Qb of the second line. The broken line shows the actual brake fluid pressure of the fluid path Pb of the first line detected by the third fluid pressure sensor Sc. The actual brake fluid pressure of the first line becomes zero due to the leak in the fluid path Pb. The single-dotted broken line shows the actual brake fluid pressure of the fluid path Qb of the second line detected by the second fluid pressure sensor Sb, and the actual brake fluid pressure starts to rise with a delay accompanying an increase in the stroke of the slave cylinder 42 since a leak has not occurred in the fluid path Qb. The reason why the start of the rise of the actual brake fluid pressure is delayed is that a brake fluid pressure is not generated in the second fluid pressure chamber 50B until the first piston 48A of the slave cylinder 42 bottoms out against the second piston 48B due to the leak in the fluid path Pb of the first line, and a brake fluid pressure is not generated in the fluid path Qb of the second line while the first piston 48A is idling.

When a leak has occurred in the fluid path Qb of the second line and a leak has not occurred in the fluid path Pb of the first line, the actual brake fluid pressure detected by the third fluid pressure sensor Sc of the first line has the characteristics shown by the single-dotted broken line, and the actual brake fluid pressure detected by the second fluid pressure sensor Sb of the second line has the characteristics shown by the broken line.

In FIG. 7, the hatched region that is set for an area where the stroke of the slave cylinder 42 is equal to or greater than s1 denotes a leak determination region in which it is determined that a leak has occurred downstream of the slave cylinder 42, and the occurrence of a leak malfunction can be rapidly determined by the brake fluid pressure (broken line) of the first line where there is a leak malfunction and the brake fluid pressure (single-dotted broken line) of the second line where there is no leak malfunction entering the leak determination region.

In this process, the brake fluid pressure (broken line) of the first line where there is a leak malfunction is zero over the entire leak determination region whereas the brake fluid pressure (single-dotted broken line) of the second line where there is no leak malfunction enters the leak determination region only in a stroke range of s1 to s2, and it is thus possible to determine that a leak malfunction has occurred in the fluid path Pb of the first line. Furthermore, when the outputs from the second and third fluid pressure sensors Sb and Sc are reversed, it is possible to determine that a leak malfunction has occurred in the fluid path Qb of the second line. Moreover, when the outputs from the second and third fluid pressure sensors Sb and Sc both become zero, it is possible to determine that a leak malfunction has occurred in both the fluid paths Pb and Qb of the first and second lines.

If a leak determination region were to be set beneath the line shown by the double-dotted broken line in FIG. 7, even when the outputs from the second and third fluid pressure sensors Sb and Sc are normal, a region where the stroke is equal to or less than s0 would fall into the leak determination region, and there would be a possibility of an erroneous determination of a leak malfunction. However, in the present embodiment, since the leak determination region is set for an area where the stroke is equal to or greater than s1, an erroneous determination can be avoided.

Determination of a leak on the downstream side is explained above, but it is also possible to determine a blockage of a fluid path on the downstream side from the relationship between the brake fluid pressure and the stroke of the slave cylinder 42. That is, if a fluid path on the downstream side is blocked, only a slight stroke of the slave cylinder 42 makes the brake fluid pressure on the downstream side rise steeply, and it is therefore possible to determine that the fluid path on the downstream side is blocked when the relationship between the brake fluid pressure and the stroke of the slave cylinder 42 enters the hatched region on the upper side in FIG. 7.

As hereinbefore described, in accordance with the present embodiment, the deterioration determination means M1 can reliably determine a leak downstream of the slave cylinder 42 by a simple calculation by applying the actual stroke of the slave cylinder 42 detected by the slave cylinder stroke sensor Se and the actual brake fluid pressure downstream of the slave cylinder 42 detected by the second and third fluid pressure sensors Sb and Sc to the map showing the relationship between the preset stroke of the slave cylinder 42 and the brake fluid pressure downstream of the slave cylinder 42.

Furthermore, if an attempt were to be made to determine that a leak had occurred by providing the reservoir 69 of the slave cylinder 42 with a brake fluid level sensor, it would not be possible to determine that a leak had occurred until the level of brake fluid of the reservoir 69 had attained a predetermined value or below, but in accordance with the present embodiment it is possible to determine a leak at the same time as its occurrence. Moreover, a leak of brake fluid toward the reservoir 69 side via the cap seal of the slave cylinder 42 cannot be determined by the level sensor since the level of brake fluid of the reservoir 69 does not change, but in accordance with the present embodiment, monitoring the actual brake fluid pressure enables a leak of brake fluid via the cap seal to be also determined Furthermore, since the third fluid pressure sensor Sc, which is provided for controlling the VSA device 23, is utilized as a fluid pressure sensor for leak determination, it becomes possible to reduce the number of components and the cost.

When an electric automobile or a hybrid vehicle equipped with a drive motor for travel carries out regenerative braking, in order to enhance the energy recovery efficiency, regenerative braking has priority, and when the braking force from regenerative braking alone becomes insufficient, the extent to which it is insufficient is compensated for by hydraulic braking. Furthermore, when a battery is in a fully charged state and regenerative braking cannot be carried out, only hydraulic braking is carried out. Therefore, different pedal stroke—target fluid pressure maps are used for a case in which only hydraulic braking is carried out and for a case in which regenerative braking and hydraulic braking are carried out in combination (see FIG. 6).

As described above, in accordance with the use of different pedal stroke—target fluid pressure maps for when executing regenerative braking and for when not executing regenerative braking, it is possible to carry out leak determination by the deterioration determination means M1 without problems either when executing regenerative braking or when not executing it.

Furthermore, since the target fluid pressure for the slave cylinder 42 changes rapidly at the instant of switching between different pedal stroke—target fluid pressure maps, there is a possibility that the actual brake fluid pressure detected by the second and third fluid pressure sensors Sb and Sc will change suddenly and the deterioration determination means M1 will not be able to carry out a correct leak determination.

In the present embodiment, the deterioration determination means M1 monitors the state of regenerative braking and temporarily inhibits leak determination when switching between different pedal stroke—target fluid pressure maps for when executing regenerative braking and for when not executing regenerative braking, and this enables erroneous determination of a leak to be prevented.

In addition, when hydraulic braking and regenerative braking are executed at the same time, since only the target brake fluid pressure for the slave cylinder 42 changes and the relationship between the actual amount of actuation of the slave cylinder 42 and the actual brake fluid pressure downstream of the slave cylinder 42 does not change greatly, the relationship of FIG. 7 can be used as it is.

A second embodiment of the present invention is now explained by reference to FIG. 8 and FIG. 9.

Second Embodiment

Figure 8:
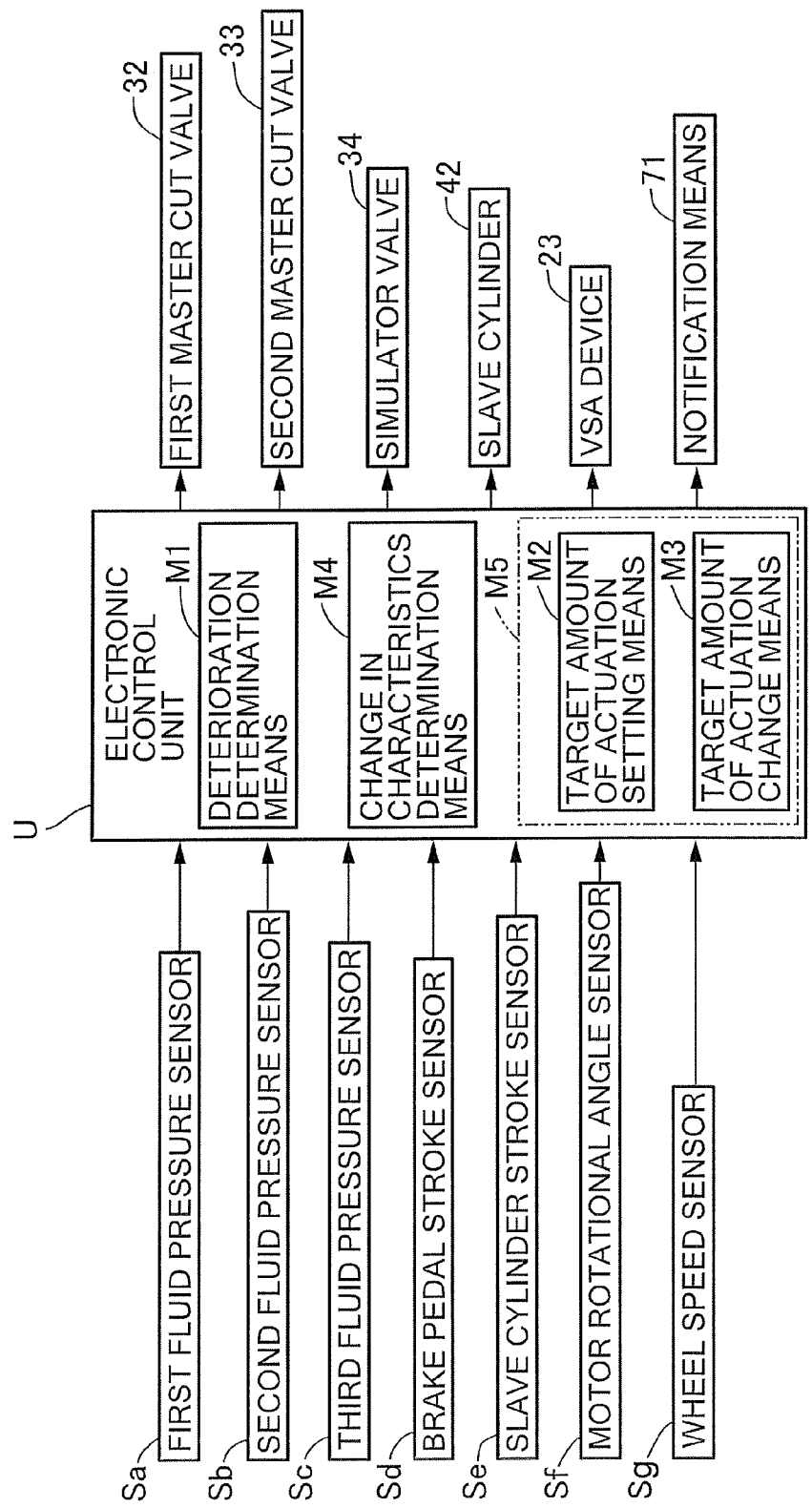
FIG. 8 is a view corresponding to FIG. 2. (second embodiment)
Figure 9:
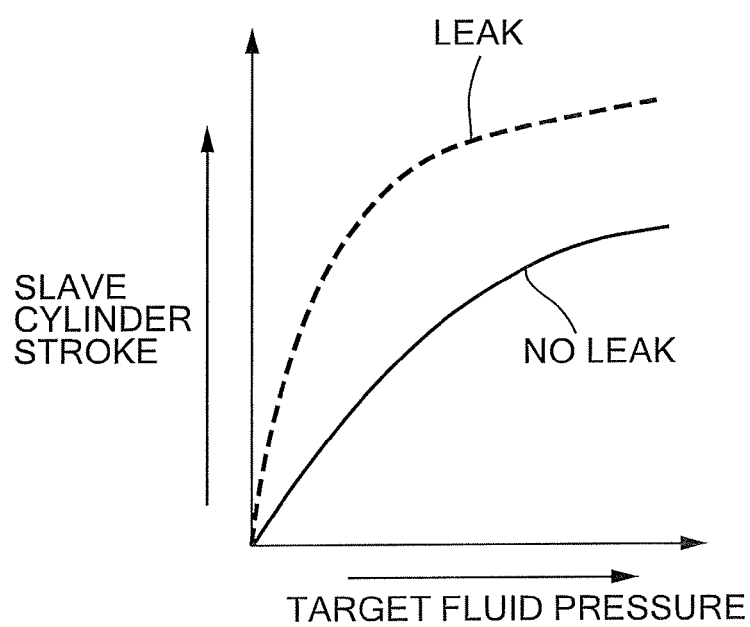
FIG. 9 is a diagram showing a target fluid pressure—slave cylinder stroke map. (second embodiment)

As shown in FIG. 8, connected to an output side of an electronic control unit U is notification means 71 such as a buzzer, a chime, or a lamp that generates an alarm for a driver. Furthermore, control means M5 of the electronic control unit U is provided with target amount of actuation setting means M2 that sets a target stroke for a slave cylinder 42 from a target fluid pressure that is to be generated by the slave cylinder 42, and target amount of actuation change means M3 that changes the target stroke for the slave cylinder 42 set by the target amount of actuation setting means M2 when a leak is determined In FIG. 5, correction is carried out by calculating a deviation between a target fluid pressure to be generated by the slave cylinder 42 calculated from a pedal stroke—target fluid pressure map and the actual fluid pressure generated by the slave cylinder 42 and detected by a second fluid pressure sensor Sb, and adding to the target fluid pressure a fluid pressure correction amount calculated from the deviation. Subsequently, the corrected target fluid pressure is applied to the map (target fluid pressure—slave cylinder stroke map) showing the relationship between the fluid pressure generated by the slave cylinder 42 and the stroke of the slave cylinder 42, thus calculating a target stroke for the slave cylinder 42. This target fluid pressure—slave cylinder stroke map is determined by the characteristics of the slave cylinder 42 and is preset by the target amount of actuation setting means M2.

Subsequently, a deviation between a target rotational angle for a motor 44 calculated by multiplying the target stroke for the slave cylinder 42 by a predetermined gain and the actual rotational angle of the motor 44 detected by a motor rotational angle sensor Sf is calculated, and driving the motor 44 with a motor control amount calculated from the above deviation allows the slave cylinder 42 to generate a brake fluid pressure corresponding to the stroke of the brake pedal 12 detected by a brake pedal stroke sensor Sd.

When a leak occurs in one of first and second lines downstream of the slave cylinder 42, as shown by the single-dotted broken line in FIG. 7, a brake fluid pressure is generated in the other line where a leak has not occurred. However, since this brake fluid pressure is small compared with the brake fluid pressure of the proper ideal characteristics and, moreover, is generated with a delay after the stroke of the slave cylinder 42 attains a predetermined value, if actuation of the slave cylinder 42 is controlled in the same manner as when the situation is normal when a leak has not occurred, the braking force decreases and the driver experiences an uncomfortable sensation.

In the present embodiment, when deterioration determination means M1 determines the occurrence of a leak, target amount of actuation change means M3 switches the target fluid pressure—slave cylinder stroke maps set by the target amount of actuation setting means M2. As shown in FIG. 9, for the same target fluid pressure the stroke of the slave cylinder 42 is set to be larger in a target fluid pressure—slave cylinder stroke map (broken line) for when a leak has occurred than in a target fluid pressure—slave cylinder stroke map (solid line) for when a leak has not occurred.

In FIG. 5, a deviation between the actual brake fluid pressure (single-dotted broken line of FIG. 7) detected by, among second and third fluid pressure sensors Sb and Sc, a fluid pressure sensor for which a leak has not occurred and the target fluid pressure is calculated, and feedback control in which the target fluid pressure has added thereto a fluid pressure correction amount calculated from the above deviation is carried out, thereby enabling control of the slave cylinder 42 to be continued without greatly decreasing the fluid pressure to be generated.

In this process, setting is carried out such that the brake fluid pressure of the line in which a leak has not occurred is increased from that before changing, but the brake fluid pressure of the line in which a leak has occurred is greatly decreased, and the total braking force is decreased to some extent compared with that before changing. When a leak occurs downstream of the slave cylinder 42, the brake fluid pressure decreases, and a braking force anticipated by the driver is not generated. However, as described above, the target amount of actuation change means M3 changes the target fluid pressure—slave cylinder stroke maps according to the occurrence of a leak such that the deceleration is decreased to a degree that the driver can feel it while eliminating any uncomfortable sensation for the driver by reliably generating a necessary deceleration, thus making the driver recognize that a leak has occurred and thereby preventing driving from being continued in an abnormal state in which there is a leak.

Furthermore, since notification means 71 is actuated to notify the driver of the occurrence of a leak prior to the target amount of actuation change means M3 switching the target fluid pressure—slave cylinder stroke maps, the driver can anticipate a change in braking force accompanying the target fluid pressure—slave cylinder stroke maps being switched, thus alleviating any uncomfortable sensation.

The shaded region in FIG. 7 shows a region in which the characteristics of the brake fluid pressure can be corrected to ideal characteristics by the target amount of actuation change means M3 switching the target fluid pressure—slave cylinder stroke maps even when a leak occurs. White regions on upper and lower sides of the shaded region are regions in which the characteristics of the brake fluid pressure cannot be corrected to ideal characteristics even by switching the target fluid pressure—slave cylinder stroke maps, and in this case control of the slave cylinder 42 is continued in a state in which the braking force is slightly decreased.

Third Embodiment

The deterioration determination means M1 of the first and second embodiments described above is for determining a leak in a fluid path, but deterioration determination means M1 of the third embodiment determines a blockage of a fluid path. That is, the deterioration determination means M1 of an electronic control unit U shown in FIG. 2 determines that there is a blockage due to foreign matter in fluid paths Qa, Ra, and Rb providing a connection between a master cylinder 11 and a stroke simulator 35 or a blockage due to seizure of a simulator valve 34 at a valve-closed position based on the actual stroke of a brake pedal 12 detected by a brake pedal stroke sensor Sd and an actual brake fluid pressure generated by the master cylinder 11 and detected by a first fluid pressure sensor Sa.

Determination of a blockage in the fluid paths Qa, Ra, and Rb providing a connection between the master cylinder 11 and the stroke simulator 35 by the deterioration determination means M1 is now explained.

Figure 10:
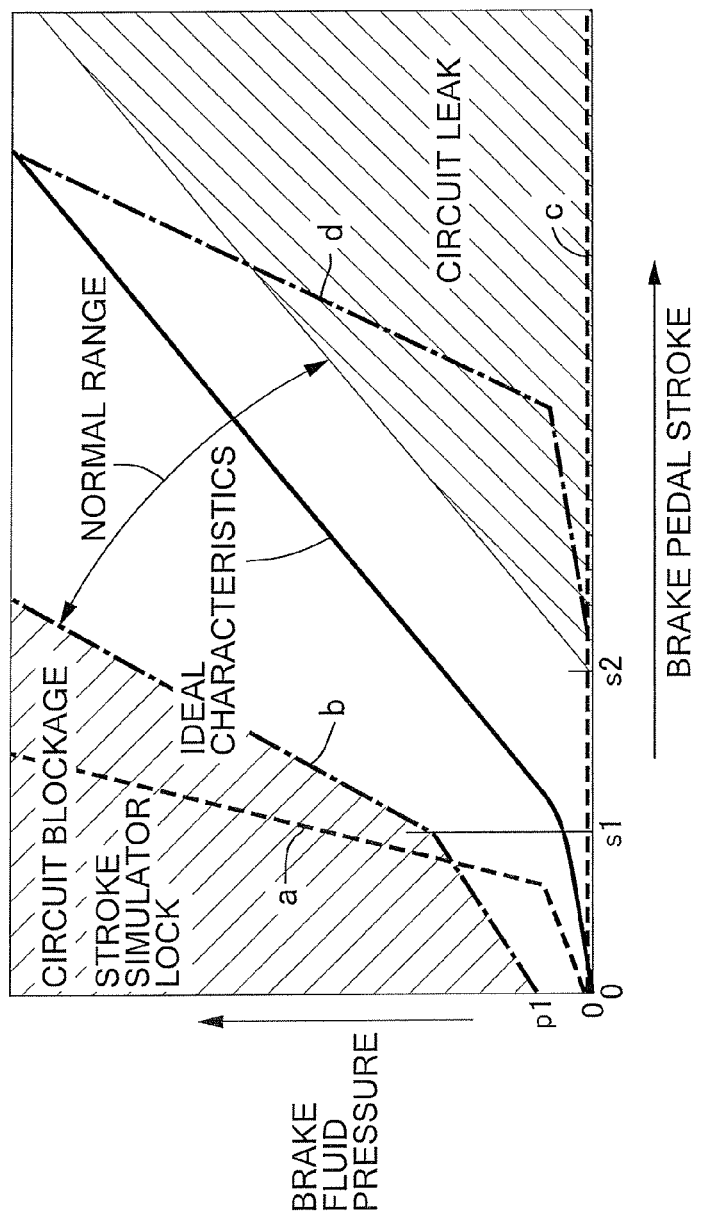
FIG. 10 is a diagram showing a map for determining a malfunction on the upstream side. (third embodiment)

FIG. 10 shows a map that is used for determination of a blockage, and shows the relationship between the stroke of the brake pedal 12 and the brake fluid pressure generated in the fluid path Qa downstream of the master cylinder 11 in a state in which first and second master cut valves 32 and 33 are closed.

As shown in the figure by a solid line as ideal characteristics, at the beginning when the stroke of the brake pedal 12 starts increasing from zero, the brake fluid pressure rises with a small slope. The reason why the slope of the rise in the brake fluid pressure is small is because of backlash in movable parts of the brake pedal 12 and the master cylinder 11, flexing of a cap seal of the master cylinder 11, swelling due to an increase in the internal pressure of the fluid paths Pa, Qa, Ra, and Rb, etc. When the stroke of the brake pedal 12 exceeds a predetermined value, the brake fluid pressure increases with a slope that is larger than the above slope in response to an increase in the stroke.

When the fluid paths Qa, Ra, and Rb from the master cylinder 11 to the stroke simulator 35 are blocked, brake fluid issued from the master cylinder 11 cannot reach its destination, stroke of the brake pedal 12 becomes difficult, and as shown by the broken line a in FIG. 10, the brake fluid pressure generated by the master cylinder 11 rises steeply. Therefore, the hatched region on the upper side in FIG. 10 is defined as a blockage determination region for determining that the fluid paths Qa, Ra, and Rb from the master cylinder 11 to the stroke simulator 35 are blocked, and when the actual brake fluid pressure detected by the first fluid pressure sensor Sa enters the blockage determination region, the occurrence of a blockage can be determined In this process, since the slope of a threshold value (single-dotted broken line b) on the border of the blockage determination region is set to be small in a region in which the stroke of the brake pedal 12 is from zero to s1 and to increase in a region in which it is equal to or greater than s1, that is, it is set so as to move the ideal characteristics of the brake fluid pressure, shown by the solid line, upward and substantially in parallel, it is possible to set a blockage determination region that is commensurate with characteristics of the brake fluid pressure that depend on the stroke of the brake pedal 12, thus enhancing the precision with which a blockage is determined Furthermore, since the threshold value (single-dotted broken line b) on the border of the blockage determination region is not set at zero when the stroke of the brake pedal 12 is zero and is set so as to rise from a predetermined value p1, that is, determination of a blockage is carried out only when the actual brake fluid pressure detected by a first fluid pressure sensor Sa is at least the predetermined value p1, it is possible to avoid an erroneous determination in a low load region, in which the precision of detection of the first fluid pressure sensor Sa is low.

In addition, when it is determined that the fluid paths Qa, Ra, and Rb from the master cylinder 11 to the stroke simulator 35 are blocked, the first and second master cut valves 32 and 33 are opened and the actuation of the slave cylinder 42 is stopped, thereby making it possible to transmit the brake fluid pressure generated by the master cylinder 11 to wheel cylinders 26, 27, 30, and 31 via a fluid path in which there is no blockage, thus ensuring that there is a minimum necessary braking force.

Furthermore, in the embodiment, the first fluid pressure sensor Sa is provided not in the fluid path Qa of the second line, which is connected to the stroke simulator 35, but in the fluid path Pa of the first line, which is not connected to the stroke simulator 35; if the fluid paths Qa, Ra, and Rb providing a connection between the master cylinder 11 and the stroke simulator 35 are blocked, in association therewith the brake fluid pressure of the fluid path Pa of the first line also increases steeply, and there is therefore no problem even when the first fluid pressure sensor Sa is provided in the fluid path Pa of the first line.

As described above, in accordance with the present embodiment, the deterioration determination means M1 applies the actual stroke of the brake pedal 12 detected by the brake pedal stroke sensor Sd and the actual brake fluid pressure generated by the master cylinder 11 and detected by the first fluid pressure sensor Sa to the map showing the relationship between the preset stroke of the brake pedal 12 and the brake fluid pressure generated by the master cylinder 11, and it is thereby possible to reliably determine a blockage in the fluid paths Qa, Ra, and Rb providing a connection between the master cylinder 11 and the stroke simulator 35 by a simple calculation.

A fourth embodiment of the present invention is now explained.

Fourth Embodiment

When there is a leak in a fluid path Pa from a master cylinder 11 to a first master cut valve 32, no brake fluid pressure is generated in a first fluid pressure chamber 17 of the master cylinder 11, a first piston 14 bottoms out and a second piston 15 starts moving forward, and a brake fluid pressure is then generated in a second fluid pressure chamber 19.

Therefore, a brake fluid pressure detected by a first fluid pressure sensor Sa provided in the fluid path Pa remains at zero as shown by the broken line c in FIG. 10. If the first fluid pressure sensor Sa is provided in a fluid path Qa, a brake fluid pressure detected by the first fluid pressure sensor Sa remains at zero until the first piston 14 bottoms out as shown by the single-dotted broken line d in FIG. 10, and it rises from zero when the second piston 15 starts moving forward.

On the other hand, if there is a leak in fluid paths Qa, Ra, and Rb from the master cylinder 11 to a second master cut valve 33 or a stroke simulator 35, the first and second pistons 14 and 15 of the master cylinder 11 run idle, no brake fluid pressure is generated in the first and second fluid pressure chambers 17 and 19, and after the second piston 15 bottoms out, a brake fluid pressure is generated in the first fluid pressure chamber 17.

Therefore, the brake fluid pressure detected by the first fluid pressure sensor Sa provided in the fluid path Pa remains at zero as shown by the single-dotted broken line d in FIG. 10 until the second piston 15 bottoms out, and rises from zero after the second piston 15 has bottomed out. If the first fluid pressure sensor Sa is provided in the fluid path Qa, a brake fluid pressure detected by the first fluid pressure sensor Sa remains at zero as shown by the broken line c in FIG. 10.

From the above, the hatched region on the lower side in FIG. 10 is defined as a leak determination region in which it is determined that there is a leak in the fluid paths Pa, Qa, Ra, and Rb from the master cylinder 11 to the first and second master cut valves 32 and 33 or the stroke simulator 35, and it is possible to determine that a leak has occurred when the actual brake fluid pressure detected by the first fluid pressure sensor Sa enters the leak determination region.

In this process, the leak determination region is not provided in the vicinity of an area where the stroke of a brake pedal 12 is zero, but since it is set for an area where the stroke is equal to or greater than s2, that is, determination of a leak is carried out only when the brake pedal stroke detected by a brake pedal stroke sensor Sd is at least a predetermined value s2, it is possible to avoid an erroneous determination in a low load region where the precision of detection by the first fluid pressure sensor Sa is low.

As described above, in accordance with the present embodiment, deterioration determination means M1 applies the actual stroke of the brake pedal 12 detected by the brake pedal stroke sensor Sd and the actual brake fluid pressure generated by the master cylinder 11 and detected by the first fluid pressure sensor Sa to a map showing the relationship between the preset stroke of the brake pedal 12 and the brake fluid pressure generated by the master cylinder 11, and it is thus possible to rapidly and reliably determine that there is a leak in the fluid paths Pa, Qa, Ra, and Rb from the master cylinder 11 to the first and second master cut valves 32 and 33 or the stroke simulator 35 by a simple calculation.

Furthermore, as in the present embodiment, when the first fluid pressure sensor Sa is provided in a first line, when the brake fluid pressure detected by the first fluid pressure sensor Sa attains a state of the broken line c in FIG. 10 it can be determined that a leak has occurred in the first line, and when it attains a state of the single-dotted broken line d in FIG. 10 it can be determined that a leak has occurred in a second line.

If the first fluid pressure sensor Sa is provided in the second line, when the brake fluid pressure detected by the first fluid pressure sensor Sa attains a state of the single-dotted broken line d in FIG. 10 it can be determined that a leak has occurred in the first line, and when it attains a state of the broken line c in FIG. 10 it can be determined that a leak has occurred in the second line.

Since a leak in the fluid paths Pa, Qa, Ra, and Rb from the master cylinder 11 to the first and second master cut valves 32 and 33 or the stroke simulator 35 does not affect the generation of brake fluid pressure by a slave cylinder 42, in this case only notification of an abnormality is executed without changing a control mode of the slave cylinder 42, thereby enabling braking by the brake actuator 42 to be continued.

The operations of the first to fourth embodiments are now summarized and explained by reference to the flowcharts of FIG. 11 to FIG. 13.

Figure 11:
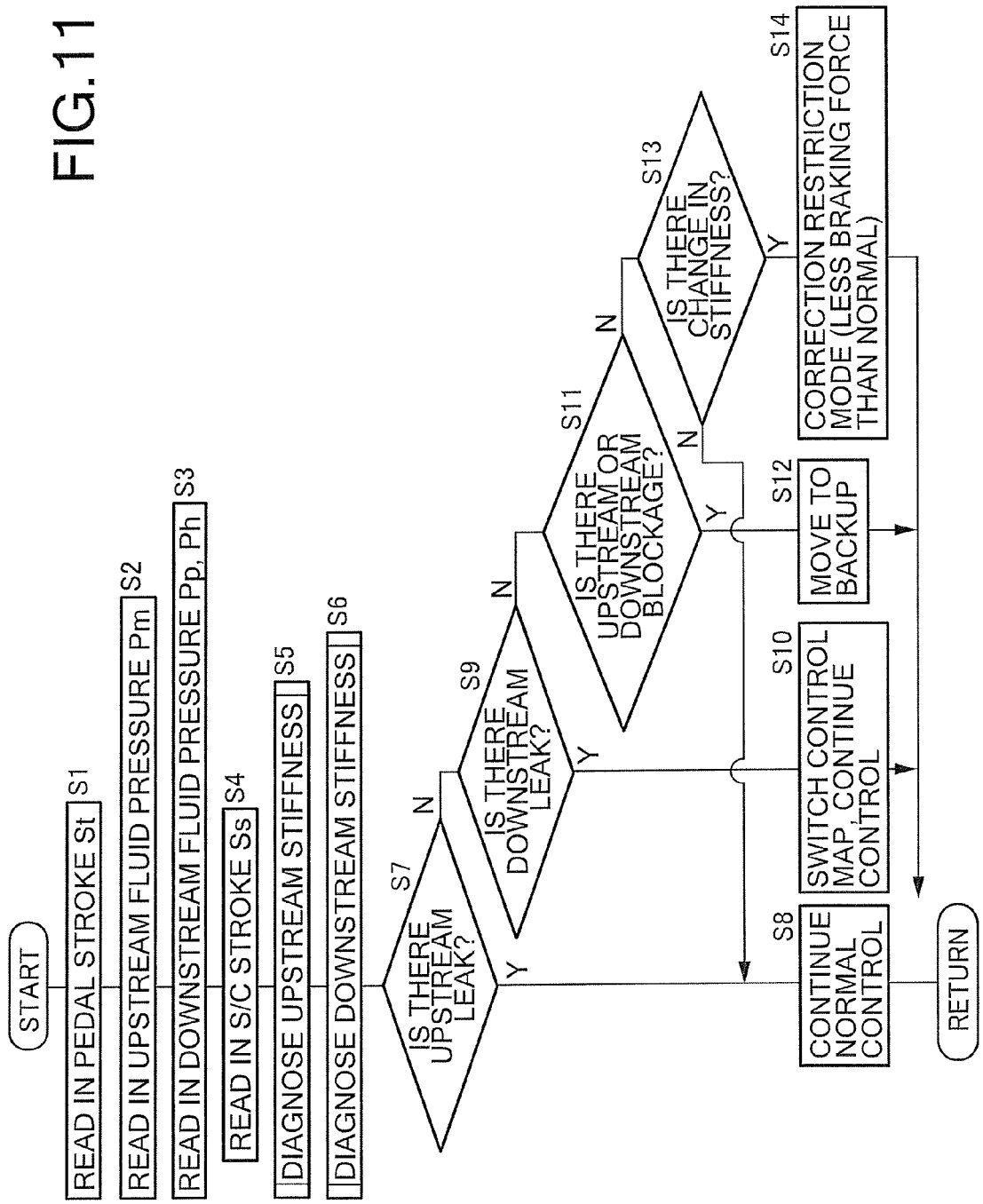
FIG. 11 is a flowchart of a main routine. (first to fourth embodiments)

First, in step S1 of a main routine of FIG. 11 a brake pedal stroke St detected by the brake pedal stroke sensor Sd is read in, in step S2 an upstream fluid pressure Pm detected by the first fluid pressure sensor Sa is read in, in step S3 a downstream fluid pressure Pp (or a downstream fluid pressure Ph) detected by the second fluid pressure sensor Sb (or the third fluid pressure sensor Sc) is read in, in step S4 a slave cylinder stroke Ss detected by the slave cylinder stroke sensor Se is read in, then in step S5 the hydraulic stiffness on the upstream side of the first and second master cut valves 32 and 33 is diagnosed, and in step S6 the hydraulic stiffness on the downstream side of the first and second master cut valves 32 and 33 is diagnosed.

Figure 12:
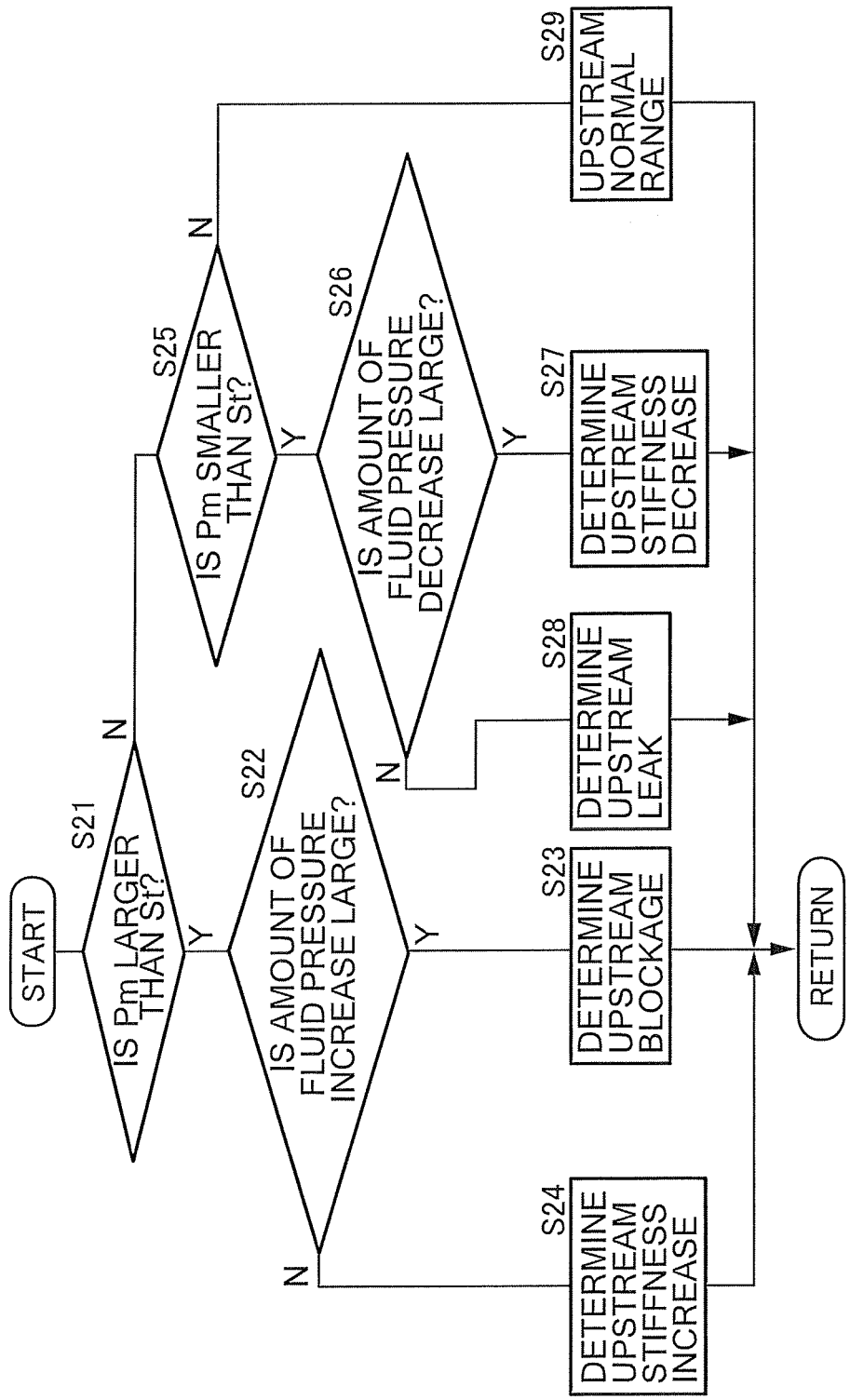
FIG. 12 is a flowchart of a subroutine of step S5. (first to fourth embodiments)

FIG. 12 shows a subroutine of step S5 (diagnosis of upstream stiffness). First, in step S21 if the upstream fluid pressure Pm with respect to the brake pedal stroke St is greater than the proper value determined from the map, then in step S22 if the amount of increase of the upstream fluid pressure Pm is a maximum, in step S23 it is determined that one of the fluid paths Pa and Qa from the master cylinder 11 to the first and second master cut valves 32 and 33 is blocked, and if in step S22 the amount of increase of the upstream fluid pressure Pm is not a maximum, then in step S24 it is determined that the upstream stiffness is increasing. Increase of the upstream stiffness occurs for example when the first and second master cut valves 32 and 33 are seized in a half opened state.

If in step S21 the upstream fluid pressure Pm with respect to the brake pedal stroke St is equal to or less than the proper value determined from the map and in step S25 the upstream fluid pressure Pm with respect to the brake pedal stroke St is smaller than the proper value determined from the map, then in step S26 if the amount of decrease of the upstream fluid pressure Pm is a maximum, in step S27 it is determined that there is a possibility that the upstream stiffness has decreased due to a valve-opening malfunction in the first and second master cut valves 32 and 33, and if in step S26 the amount of decrease of the upstream fluid pressure Pm is not a maximum, then in step S28 it is determined that a leak has occurred in the fluid path Pa or the fluid path Qa.

Figure 13:
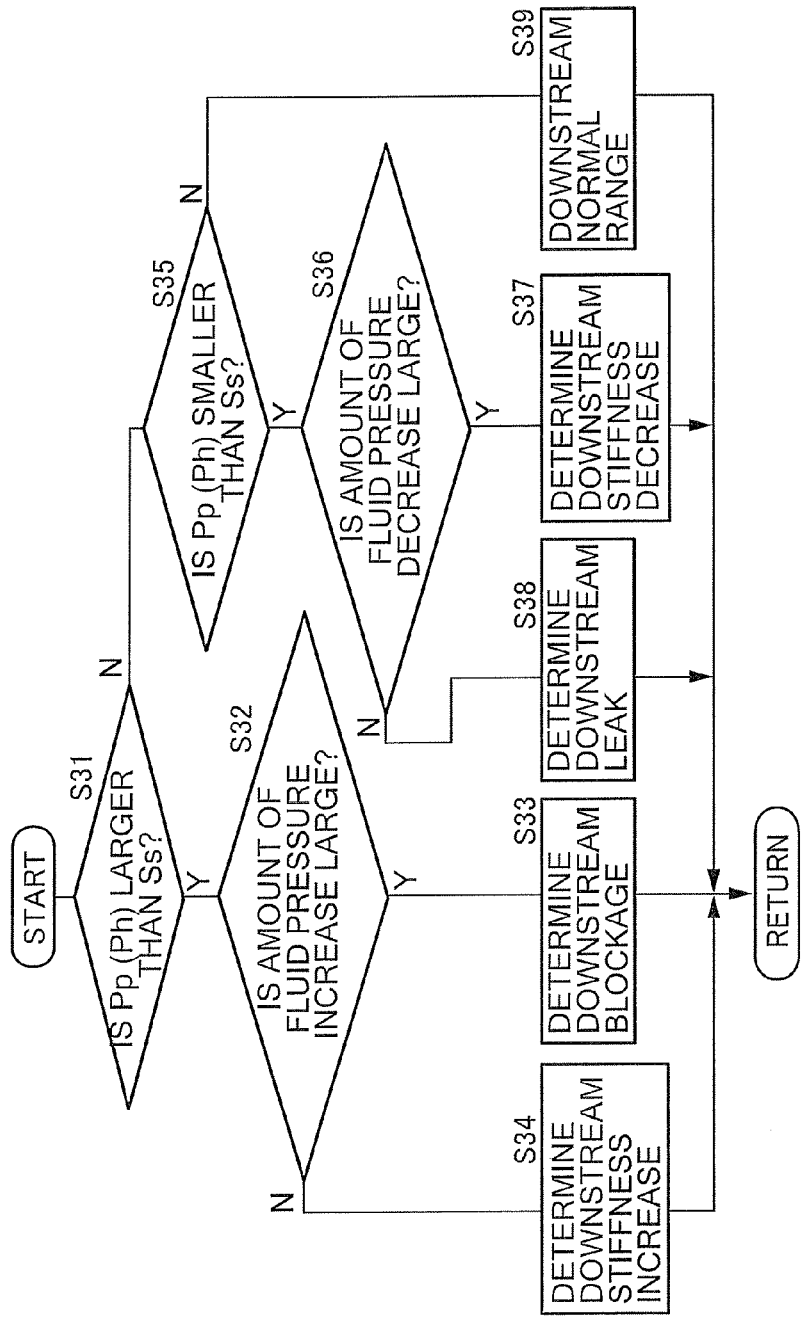
FIG. 13 is a flowchart of a subroutine of step S6. (first to fourth embodiments)

FIG. 13 shows a subroutine of step S6 (diagnosis of downstream stiffness). First, in step S31 if the downstream fluid pressure Pp with respect to the slave cylinder stroke Ss is larger than the proper value determined from the map, then if in step S32 the amount of increase of the downstream fluid pressure Pp is a maximum, in step S33 it is determined that one of the fluid paths Pb and Qb from the slave cylinder 42 to a VSA device 23 is blocked, and if in step S32 the amount of increase of downstream fluid pressure Pp is not a maximum, then in step S34 it is determined that the downstream stiffness is increasing. Increase of the downstream stiffness occurs for example when the fluid paths Pc, Pd, Qc, and Qd from the VSA device 23 to the wheel cylinders 26, 27, 30, and 31 are blocked.

If in step S31 the downstream fluid pressure Pp with respect to the slave cylinder stroke Ss is equal to or less than the proper value determined from the map and in step S35 the downstream fluid pressure Pp with respect to the slave cylinder stroke Ss is smaller than the proper value determined from the map, then if in step S36 the amount of decrease of the downstream fluid pressure Pp is a maximum, in step S37 it is determined that there is a possibility that the downstream stiffness has decreased due to a valve-opening malfunction of the first and second master cut valves 32 and 33, and if in step S36 the amount of decrease of the downstream fluid pressure Pp is not a maximum, then in step S38 it is determined that a leak has occurred in the fluid path Pb or the fluid path Qb.

Referring back to the flowchart of FIG. 11, if in step S7 there is an upstream leak, then in step S8 the slave cylinder 42 is controlled as normal, and braking is carried out with the brake fluid pressure generated by the slave cylinder 42. In this case, since the upstream leak does not directly affect the fluid path on the downstream side, braking by the slave cylinder 42 can be carried out without problem.

If in step S7 there is no upstream leak and in step S9 there is a downstream leak, then in step S10 the control maps are switched over, and control of the slave cylinder 42 is continued. That is, if there is a leak in a fluid path of one of the two lines on the downstream side, braking is continued by the fluid path of the other line in which there is no leak, and in this case in order to minimize the total decrease in the braking force by enhancing the braking force in the line without a leak, the maps for determining the amount of actuation of the slave cylinder 42 are changed.

If in step S9 there is no downstream leak and in step S11 there is a blockage upstream or downstream, then in step S12 the process moves to backup, and the brake fluid pressure generated by the master cylinder 11 is supplied to the wheel cylinders 26, 27, 30, and 31 via the fluid path of the line without a blockage, thus carrying out backup by the master cylinder 11.

If in step S11 there is no upstream or downstream blockage and in step S13 there is a change in stiffness upstream or downstream, the process moves to a correction restriction mode. In the correction restriction mode, the amount of control of the slave cylinder 42 is corrected by a method that is described later. Furthermore, if in step S13 there is no stiffness change upstream or downstream, then in step S8 the slave cylinder 42 is controlled as normal.

Figure 14:
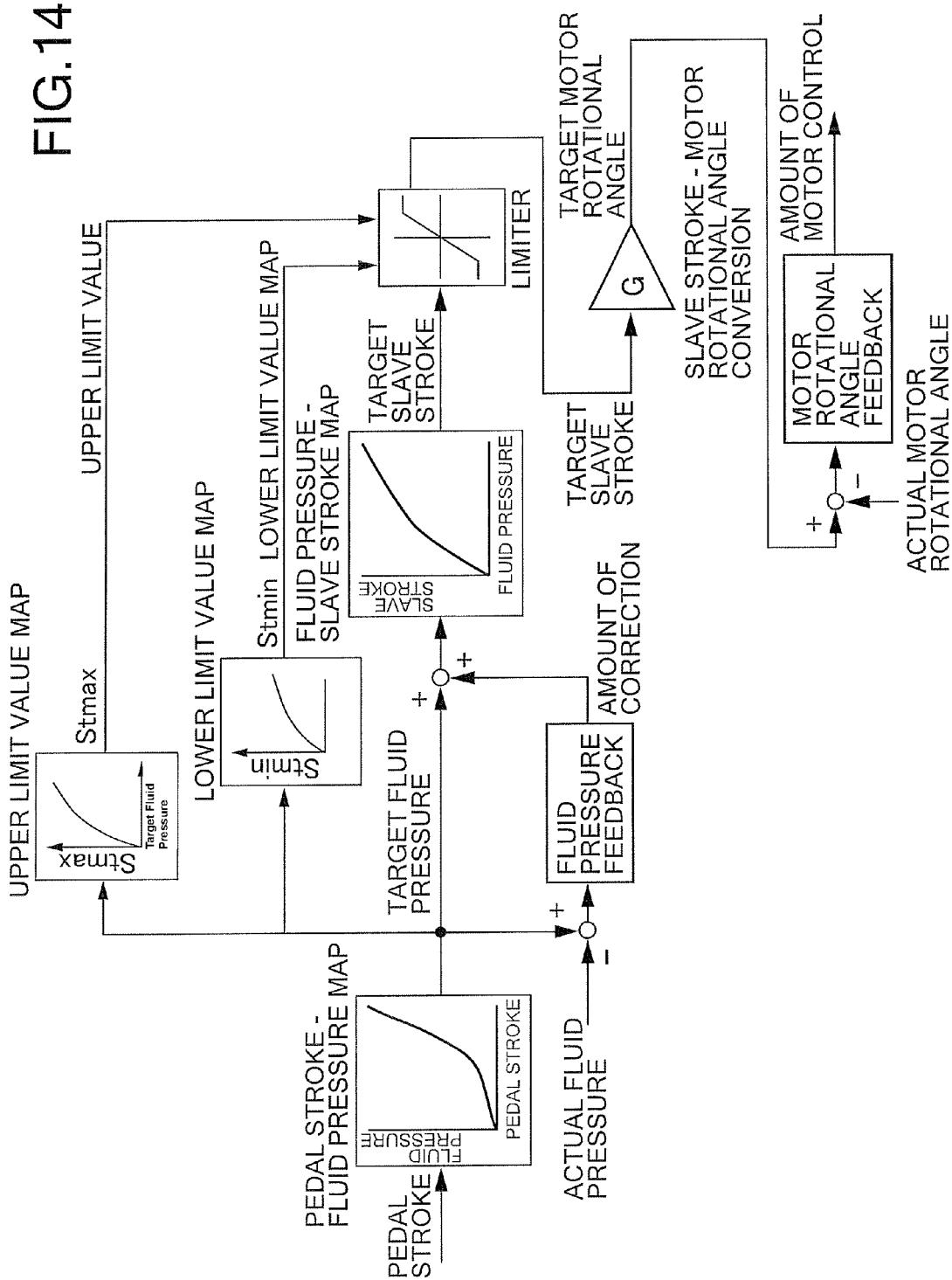
FIG. 14 is a block diagram of a control system for a slave cylinder. (fifth embodiment)

Referring to FIG. 14, the correction restriction mode of step S13 of the main routine of the flowchart in FIG. 11 is now explained.

As is clear from a comparison between FIG. 5 (first embodiment) and FIG. 14 (fifth embodiment), a control system for a slave cylinder 42 of a fifth embodiment includes a lower limit value map, an upper limit value map, and a limiter. A lower limit value Stmin and an upper limit value Stmax of the target stroke for the slave cylinder 42 are looked up in the lower limit value map and the upper limit value map by using the target fluid pressure outputted from the pedal stroke— target fluid pressure map as a parameter, and the values are outputted. A target stroke for the slave cylinder 42 outputted from the map showing the relationship between the fluid pressure and the stroke of the slave cylinder 42 is inputted into the limiter and limit-processed using the lower limit value Stmin and the upper limit value Stmax. A deviation between a target rotational angle for a motor 44 calculated by multiplying the limit-processed target stroke for the slave cylinder 42 by a predetermined gain and the actual rotational angle of the motor 44 detected by a motor rotational angle sensor Sf is calculated, and the motor 44 is driven with an amount of motor control calculated from the deviation.

Therefore, due to the occurrence of a change in stiffness upstream or downstream in step S13 of the flowchart of FIG. 11, the target fluid pressure is corrected by an amount of correction that is commensurate with the deviation between the target fluid pressure and the actual fluid pressure of the slave cylinder 42, the target stroke for the slave cylinder 42 is corrected thereby, and the upper limit and lower limit for the target stroke are thus limited. As a result, in the white region of the map of FIG. 7, the brake fluid pressure generated by the slave cylinder 42 cannot be made to coincide with ideal characteristics, and control of the slave cylinder 42 is continued in a state in which the braking force is lower than a target value.

This enables the driver to feel a decrease in the braking force through the body and recognize the occurrence of an abnormality (change in stiffness upstream or downstream) while ensuring a minimum necessary amount of braking force even if a change in stiffness occurs upstream or downstream.

Embodiments of the present invention are explained above, but the present invention may be modified in a variety of ways as long as the modifications do not depart from the spirit and scope thereof.

For example, in the embodiments the third fluid pressure sensor Sc, which is provided for controlling the VSA device 23, is utilized as a fluid pressure sensor for leak determination but a third fluid pressure sensor Sc used exclusively for leak determination may be provided.

Furthermore, in the embodiments the second and third fluid pressure sensors Sb and Sc are provided for leak determination, but it is possible to determine the occurrence of a leak by providing either one of the second and third fluid pressure sensors Sb and Sc on their own. That is, if a fluid pressure sensor provided in one of the first and second lines detects fluid pressure characteristics shown by the broken line in FIG. 7, it can be determined that a leak malfunction has occurred in the one line, and if it detects fluid pressure characteristics shown by the single-dotted broken line in FIG. 7, it can be determined that a leak malfunction has occurred in the other line.

Moreover, if the target fluid pressure—slave cylinder stroke maps are switched over during braking when the driver is depressing the brake pedal 12, the braking force changes rapidly at that instant, and there is a possibility that the driver will experience an uncomfortable sensation. If the target fluid pressure—slave cylinder stroke maps are switched over once the brake pedal 12 has been returned, the driver does not experience an uncomfortable sensation.

Furthermore, in the embodiment the first fluid pressure sensor Sa is provided in the fluid path Pa of the first line, which is not connected to the stroke simulator 35, but it may be provided in the fluid paths Pa, Ra, Rb of the second line, which is connected to the stroke simulator 35. In this case, if a blockage occurs on the upstream side of the fluid pressure sensor, a rise of the brake fluid pressure due to the blockage cannot be detected, and the fluid pressure sensor is therefore desirably provided at a position as close to the master cylinder 11 as possible.

Moreover, the brake actuator of the present invention is not limited to the slave cylinder 42 of the embodiments and may be a system employing a known fluid pressure source in which the pressure of a high pressure source pressurized by a pump, etc. is regulated by means of a solenoid valve such as a linear valve and supplied to thus pressurize a wheel cylinder.

The invention claimed is:

1. A brake device for a vehicle comprising
an actual operation amount detection device that detects an actual amount of operation of a brake pedal by a driver, a master cylinder that generates a fluid pressure corresponding to the actual amount of operation of the brake pedal, a brake actuator that is driven according to the actual amount of operation, and at least one wheel cylinder that is actuated by a brake fluid pressure generated by the master cylinder or the brake actuator, the at least one wheel cylinder being capable of being actuated independently from the fluid pressure generated by the master cylinder by actuation of the brake actuator in a state in which a cut-off valve for cutting off communication between the master cylinder and the at least one wheel cylinder is closed, wherein
the brake device comprises
an actual actuation amount detection device that detects an actual amount of actuation of the brake actuator,
at least one actual brake fluid pressure detection device that detects an actual brake fluid pressure generated by the brake actuator,
a deterioration determination device configured to discriminate a plurality of deterioration states including at least functional deterioration of a fluid path downstream of the cut-off valve based on the actual amount of actuation and the actual brake fluid pressure,
a change in characteristics determination device configured to determine a change in characteristics based on the actual amount of actuation and the actual brake fluid pressure, the change in characteristics determination device being arranged so as to determine a change in characteristics when the actual amount of actuation and the actual brake fluid pressure enter a change in characteristics region in which the actual amount of actuation and the actual brake fluid pressure deviate by a predetermined level or greater from reference characteristics defined from a relationship between the amount of actuation of the brake actuator and the brake fluid pressure generated by the brake actuator,
a control device configured to control the brake actuator in different modes according to a deterioration state discriminated by the deterioration determination device, and further configured to control the brake actuator in a state in which the amount of actuation of the brake actuator is restricted when the change in characteristics determination device has determined that there is a change in characteristics, and
the deterioration determination device determining that there is a deterioration when the actual amount of actuation and the actual brake fluid pressure reach a deterioration region set for a region where the actual amount of actuation and the actual brake fluid pressure exceed the change in characteristics region with respect to the reference characteristics.

2. The brake device for a vehicle according to claim 1, wherein the deterioration determination device determines that there is no deterioration in a state in which the actual amount of actuation is equal to or less than a predetermined value.

3. The brake device for a vehicle according to claim 1, wherein the brake device further comprises a drive motor that is capable of applying a regenerative braking force to a wheel, and the deterioration determination device carries out determination of deterioration during regenerative braking by the drive motor.

4. The brake device for a vehicle according to claim 1, wherein the deterioration determination device monitors whether a regenerative braking force is in a predetermined state and wherein the determination of deterioration occurs when the deterioration determination device determines that the regenerative braking force is in a state other than the predetermined state.

5. The brake device for a vehicle according to claim 1, wherein the brake actuator is arranged so as to generate a fluid pressure in each of a plurality of brake fluid paths through a plurality of lines to the at least one wheel cylinder so that each is actuated by a respective brake fluid pressure generated by the brake actuator, and wherein the at least one actual brake fluid pressure detection device includes a plurality of actual brake fluid pressure detection devices each along one of the plurality of lines and
the deterioration determination device determining as one of the plurality of deterioration states, with the plurality of said actual brake fluid pressure detection devices that detect a plurality of actual brake fluid pressures generated by the slave cylinder in each line, that there is a one-line leak, which is a deterioration due to a leak occurring downstream of the cut-off valve on only one of the plurality of lines, based on the actual amount of actuation and the plurality of actual brake fluid pressures.

6. The brake device for a vehicle according to claim 5, wherein when the deterioration determination device determines as one of the plurality of deterioration states that there is a one-line leak, control of only one line by the brake actuator is continued based on an actual brake fluid pressure detected by the actual brake fluid pressure detection device of another line.

7. The brake device for a vehicle according to claim 5, wherein the control device comprises a target actuation amount change device that changes the target amount of actuation for the brake actuator when the deterioration determination device determines as one of the plurality of deterioration states that there is a one-line leak.

8. The brake device for a vehicle according to claim 7, wherein the target actuation amount change device restricts change of the target amount of actuation until the actual amount of operation attains zero after the deterioration determination device determines that there is a one-line leak.

9. The brake device for a vehicle according to claim 7, wherein the brake device comprises a notification device that notifies a driver of a change in the target amount of actuation prior to the target actuation amount change device changing the target amount of actuation.

10. The brake device for a vehicle according to claim 7, wherein the target actuation amount change device changes the target amount of actuation such that the braking force generated after the target amount of actuation is changed is smaller than the braking force generated before the target amount of actuation is changed.

11. The brake device for a vehicle according to claim 1, wherein the brake device further comprises a stroke simulator that receives brake fluid from the master cylinder and applies a reaction force to operation of the brake pedal, and an upstream fluid pressure detection device that detects an upstream fluid pressure generated by the master cylinder,
the deterioration determination device determining as one of the plurality of deterioration states that there is a blockage of a fluid path between the master cylinder and the cut-off valve or blockage of a fluid path between the master cylinder and the stroke simulator based on the actual amount of operation and the upstream fluid pressure.

12. The brake device for a vehicle according to claim 11, wherein the deterioration determination device sets a threshold value for the brake fluid pressure in a map showing the relationship between the amount of operation of the brake pedal and the brake fluid pressure generated by the master cylinder, and determines that there is a blockage when the actual brake fluid pressure is at least the threshold value for the given actual amount of operation.

13. The brake device for a vehicle according to claim 12, wherein the deterioration determination device determines that there is no blockage in a state in which the actual brake fluid pressure is a predetermined value or below.

14. The brake device for a vehicle according to claim 12, wherein the threshold value increases non-linearly in response to an increase in the amount of operation of the brake pedal.

15. The brake device for a vehicle according to claim 12, wherein when the deterioration determination device determines that there is a blockage, the cut-off valve is opened, and control of the brake actuator is stopped.

16. The brake device for a vehicle according to claim 1, wherein the brake device further comprises a stroke simulator that receives brake fluid from the master cylinder and applies a reaction force to operation of the brake pedal, and an upstream fluid pressure detection device that detects an upstream fluid pressure generated by the master cylinder, and
the deterioration determination device determines as one of the plurality of deterioration states that a leak has occurred in a fluid path between the master cylinder and the cut-off valve and that a leak has occurred in a fluid path between the master cylinder and the stroke simulator based on the actual amount of operation and the upstream fluid pressure.

17. The brake device for a vehicle according to claim 16, wherein the deterioration determination device sets a threshold value for the brake fluid pressure in a map showing the relationship between the amount of operation of the brake pedal and the brake fluid pressure generated by the master cylinder and determines that there is a leak when the actual brake fluid pressure for the given actual amount of operation is equal to or less than the threshold value.

18. The brake device for a vehicle according to claim 16, wherein the deterioration determination device determines that there is no leak in a state in which the actual amount of operation is a predetermined value or below.

19. The brake device for a vehicle according to claim 16, wherein the threshold value increases non-linearly in response to an increase in the amount of operation of the brake pedal.

20. The brake device for a vehicle according to claim 16, wherein when the deterioration determination device has determined that there is a leak, only notification of an abnormality is carried out without the control mode of the brake actuator being changed.

21. The brake device for a vehicle according to claim 1, wherein the brake actuator is arranged so as to generate a fluid pressure in each of a plurality of brake fluid paths through a plurality of lines to the at least one of the wheel cylinder so that each is actuated by the respective brake fluid pressure generated by the brake actuator, and wherein the at least one actual brake fluid pressure detection device includes a plurality of actual brake fluid pressure detection devices each along one of the plurality of lines and
the deterioration determination device determines as one of the plurality of deterioration states that there is a downstream blockage, which is a deterioration due to a flow path blockage occurring downstream of the cut-off valve in at least one of the plurality of lines, based on the actual amount of actuation and the plurality of actual brake fluid pressures, with a plurality of actual brake fluid pressure detection devices that detect a plurality of actual brake fluid pressures in the respective lines generated by the brake actuator.

22. The brake device for a vehicle according to claim 21, wherein the deterioration determination device sets a threshold value for a brake fluid pressure in a map showing the relationship between the actual amount of actuation and the brake fluid pressure generated by the brake actuator, and determines that there is a downstream blockage when the actual brake fluid pressure for the given actual amount of actuation is at least the threshold value.

23. The brake device for a vehicle according to claim 22, wherein the deterioration determination device determines that there is no blockage in a state in which the actual brake fluid pressure is a predetermined value or below.

24. The brake device for a vehicle according to claim 22, wherein the threshold value increases non-linearly in response to an increase in the amount of operation of the brake pedal.

25. The brake device for a vehicle according to claim 21, wherein when the deterioration determination device determines that there is a blockage, the cut-off valve is opened, and control of the brake actuator is stopped.

26. The brake device for a vehicle according to claim 1, wherein the brake device further comprises a stroke simulator that receives brake fluid from the master cylinder and applies a reaction force to operation of the brake pedal, and an upstream fluid pressure detection device that detects an upstream fluid pressure generated by the master cylinder, the deterioration determination device determines as one of the plurality of deterioration states that there is a blockage in a fluid path from the master cylinder to the wheel cylinder based on the upstream fluid pressure, the actual brake fluid pressure, the actual amount of operation, and the actual amount of actuation, and determines that there is a leak in a fluid path from the master cylinder to the wheel cylinder based on the upstream fluid pressure, the actual brake fluid pressure, the actual amount of operation, and the actual amount of actuation, and the control device opens the cut-off valve and stops actuation of the brake actuator when the deterioration determination device determines that there is the blockage, and closes the cut-off valve and allows actuation of the brake actuator when the deterioration determination device determines that there is a leak.

27. The brake device for a vehicle according to claim 1, wherein an output port of the master cylinder is connected to the at least one wheel cylinder via the fluid path and an output port of the brake actuator is connected to an intermediate portion of the fluid path via a branch passage, and the cut-off valve is interposed in the fluid path at a position upstream of that portion of the fluid path at which the branch passage leading from the output port of the brake actuator is connected.

* * * * *